US009562188B2

(12) United States Patent
Monroe et al.

(10) Patent No.: US 9,562,188 B2
(45) Date of Patent: Feb. 7, 2017

(54) COMPOSITES FOR USE IN STIMULATION AND SAND CONTROL OPERATIONS

(71) Applicant: Baker Hughes Incorporated, Houston, TX (US)

(72) Inventors: Terry D. Monroe, Tomball, TX (US); Brian B. Beall, Spring, TX (US); Naima Bestaoui-Spurr, The Woodlands, TX (US); Sumit Bhaduri, The Woodlands, TX (US); Kimberly Lant, Magnolia, TX (US); Hoang Le, Spring, TX (US); Qi Qu, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 210 days.

(21) Appl. No.: 14/491,944

(22) Filed: Sep. 19, 2014

(65) Prior Publication Data
US 2015/0083415 A1   Mar. 26, 2015

Related U.S. Application Data

(60) Provisional application No. 61/880,841, filed on Sep. 20, 2013, provisional application No. 61/880,758, filed on Sep. 20, 2013, provisional application No. 61/981,051, filed on Apr. 17, 2014, provisional application No. 61/989,267, filed on May 6, 2014.

(51) Int. Cl.
| E21B 43/267 | (2006.01) |
| E21B 43/16 | (2006.01) |
| C09K 8/58 | (2006.01) |
| C09K 8/80 | (2006.01) |
| C09K 8/524 | (2006.01) |
| C09K 8/528 | (2006.01) |
| E21B 43/02 | (2006.01) |
| E21B 43/14 | (2006.01) |
| C09K 8/56 | (2006.01) |

(52) U.S. Cl.
CPC ............. *C09K 8/805* (2013.01); *C09K 8/524* (2013.01); *C09K 8/528* (2013.01); *E21B 43/025* (2013.01); *E21B 43/14* (2013.01); *E21B 43/16* (2013.01); *E21B 43/267* (2013.01); *C09K 8/56* (2013.01)

(58) Field of Classification Search
CPC .................. C12Q 2537/157; C12Q 2563/107; C12Q 2563/137; E21B 43/16; E21B 43/267; E21B 43/26; E21B 43/025; C09K 8/584; C09K 2208/28; C09K 8/56; C09K 8/60; C09K 8/805
See application file for complete search history.

(56) References Cited

U.S. PATENT DOCUMENTS

| 3,285,339 A | 11/1966 | Walther et al. |
| 3,593,796 A | 7/1971 | Stainback et al. |
| 4,042,032 A | 8/1977 | Anderson et al. |
| 4,074,536 A | 2/1978 | Young |
| 4,231,428 A | 11/1980 | Needham et al. |
| 4,366,071 A | 12/1982 | McLaughlin et al. |
| 4,366,072 A | 12/1982 | McLaughlin et al. |
| 4,366,073 A | 12/1982 | McLaughlin et al. |
| 4,366,074 A | 12/1982 | McLaughlin et al. |
| 4,374,739 A | 2/1983 | McLaughlin et al. |
| 4,460,483 A | 7/1984 | Weaver |
| 4,462,718 A | 7/1984 | McLaughlin et al. |
| 4,498,538 A | 2/1985 | Watkins et al. |
| 4,536,304 A | 8/1985 | Borchardt |
| 4,536,305 A | 8/1985 | Borchardt et al. |

(Continued)

FOREIGN PATENT DOCUMENTS

| CN | 103013467 A | 4/2013 |
| EP | 2 433 999 A1 | 3/2012 |
| WO | 2006023143 A1 | 3/2006 |
| WO | 2006056774 A2 | 6/2006 |
| WO | 2006123143 A1 | 11/2006 |
| WO | 2008131540 A1 | 11/2008 |
| WO | 2010041033 A2 | 4/2010 |
| WO | 2010092095 A1 | 8/2010 |
| WO | 2010133175 A1 | 11/2010 |
| WO | 2011018604 A1 | 2/2011 |
| WO | 2012025805 A2 | 3/2012 |
| WO | 2012040025 A2 | 3/2012 |

OTHER PUBLICATIONS

Tak-Sing Wong, Taolei Sun, Lin Feng, Joanna Aizenberg; "Interfacial Materials With Special Wettability"; MRS Bulletin; May 2013; 6 pages; vol. 38; Materials Research Society; Warrendale, PA.

(Continued)

*Primary Examiner* — Zakiya W Bates
(74) *Attorney, Agent, or Firm* — John Wilson Jones

(57) ABSTRACT

A composite having a solid particulate and a surface modifying treatment agent on the solid particulate wherein the surface modifying treatment agent has a hydrophobic tail and an anchor for adhering the hydrophobic tail onto the solid particulate. The anchor may be metal and the hydrophobic tail may be an organo-silicon material, a fluorinated hydrocarbon or both an organo-silicon material and a fluorinated hydrocarbon. The composite may be used as a proppant in a hydraulic fracturing operation as well as a sand control particulate in a gravel packing operation. The presence of the surface modifying treatment agent on the surface of the solid particulate reduces the generation of fines and dust as well as the migration of sand during a hydraulic fracturing operation or a sand control operation. The presence of the surface modifying treatment agent on the surface of the solid particulate further enhances the crush resistance of the solid particulate.

35 Claims, 4 Drawing Sheets

(56) References Cited

U.S. PATENT DOCUMENTS

| | | |
|---|---|---|
| 4,580,633 A | 4/1986 | Watkins et al. |
| 4,585,064 A | 4/1986 | Graham et al. |
| 4,646,835 A | 3/1987 | Watkins et al. |
| 4,787,453 A | 11/1988 | Hewgill et al. |
| 5,291,949 A | 3/1994 | Dovan et al. |
| 5,406,085 A | 4/1995 | Sharma |
| 5,501,274 A | 3/1996 | Nguyen et al. |
| 5,582,249 A | 12/1996 | Caveny et al. |
| 5,730,922 A | 3/1998 | Babb et al. |
| 5,735,349 A | 4/1998 | Dawson et al. |
| 5,775,425 A | 7/1998 | Weaver et al. |
| 5,787,986 A | 8/1998 | Weaver et al. |
| 5,839,510 A | 11/1998 | Weaver et al. |
| 5,853,048 A | 12/1998 | Weaver et al. |
| 5,853,049 A | 12/1998 | Keller |
| 5,871,049 A | 2/1999 | Weaver et al. |
| 5,883,300 A | 3/1999 | Johnson |
| 5,921,317 A | 7/1999 | Dewprashad et al. |
| 5,958,578 A | 9/1999 | Blohowiak et al. |
| 6,047,772 A | 4/2000 | Weaver et al. |
| 6,059,034 A | 5/2000 | Rickards et al. |
| 6,066,403 A | 5/2000 | Sherwood et al. |
| 6,146,767 A | 11/2000 | Schwartz |
| 6,209,643 B1 | 4/2001 | Nguyen et al. |
| 6,330,916 B1 | 12/2001 | Rickards et al. |
| 6,364,018 B1 | 4/2002 | Brannon et al. |
| 6,521,334 B1 | 2/2003 | Ogawa et al. |
| 6,586,483 B2 | 7/2003 | Kolb et al. |
| 6,593,000 B2 | 7/2003 | Ohtake et al. |
| 6,683,309 B2 | 1/2004 | Sharma |
| 6,689,854 B2 | 2/2004 | Fan et al. |
| 6,749,025 B1 | 6/2004 | Brannon et al. |
| 6,772,838 B2 | 8/2004 | Dawson et al. |
| 7,040,403 B2 | 5/2006 | Nguyen et al. |
| 7,063,150 B2 | 6/2006 | Slabaugh et al. |
| 7,063,151 B2 | 6/2006 | Nguyen et al. |
| 7,163,060 B2 | 1/2007 | Weiss et al. |
| 7,166,851 B2 | 1/2007 | Sharma |
| 7,198,681 B2 | 4/2007 | Nguyen et al. |
| 7,204,311 B2 | 4/2007 | Welton et al. |
| 7,252,146 B2 | 8/2007 | Slabaugh et al. |
| 7,258,170 B2 | 8/2007 | Nguyen et al. |
| 7,261,156 B2 | 8/2007 | Nguyen et al. |
| 7,264,051 B2 | 9/2007 | Nguyen et al. |
| 7,281,150 B1 | 10/2007 | Strickland |
| 7,281,580 B2 | 10/2007 | Parker et al. |
| 7,281,581 B2 | 10/2007 | Nguyen et al. |
| 7,299,869 B2 | 11/2007 | Kalman |
| 7,314,850 B2 | 1/2008 | Taylor et al. |
| 7,325,608 B2 | 2/2008 | van Batenburg et al. |
| 7,328,744 B2 | 2/2008 | Taylor et al. |
| 7,343,972 B2 | 3/2008 | Willingham et al. |
| 7,350,571 B2 | 4/2008 | Nguyen et al. |
| 7,361,724 B2 | 4/2008 | Guire et al. |
| 7,397,072 B2 | 7/2008 | Dodabalapur et al. |
| 7,397,092 B2 | 7/2008 | Horii |
| 7,424,911 B2 | 9/2008 | McCarthy et al. |
| 7,426,961 B2 | 9/2008 | Stephenson et al. |
| 7,452,417 B2 | 11/2008 | Matula et al. |
| 7,459,209 B2 | 12/2008 | Smith et al. |
| 7,461,697 B2 | 12/2008 | Todd et al. |
| 7,500,519 B2 | 3/2009 | Weaver et al. |
| 7,534,745 B2 | 5/2009 | Taylor et al. |
| 7,538,538 B2 | 5/2009 | Dodabalapur et al. |
| 7,549,470 B2 | 6/2009 | Vinegar et al. |
| 7,550,413 B2 | 6/2009 | Huang et al. |
| 7,566,686 B2 | 7/2009 | Kippie et al. |
| 7,571,767 B2 | 8/2009 | Parker et al. |
| 7,591,313 B2 | 9/2009 | Weaver et al. |
| 7,608,571 B2 | 10/2009 | Futterer et al. |
| 7,624,802 B2 | 12/2009 | McCrary et al. |
| 7,625,674 B2 | 12/2009 | Sharma et al. |
| 7,631,697 B2 | 12/2009 | Bhavsar |
| 7,691,478 B2 | 4/2010 | Avaltroni |
| 7,691,789 B2 | 4/2010 | Fu et al. |
| 7,723,272 B2 | 5/2010 | Crews et al. |
| 7,730,948 B2 | 6/2010 | de Grood et al. |
| 7,740,940 B2 | 6/2010 | Hanson |
| 7,772,162 B2 | 8/2010 | Pope et al. |
| 7,781,381 B2 | 8/2010 | Ke et al. |
| 7,825,269 B2 | 11/2010 | Mangelsdorf et al. |
| 7,845,409 B2 | 12/2010 | Shinbach et al. |
| 7,855,169 B2 | 12/2010 | Pope et al. |
| 7,858,561 B2 | 12/2010 | Abad et al. |
| 7,879,437 B2 | 2/2011 | Hanson |
| 7,886,822 B2 | 2/2011 | Garcia-Lopez De Victoria et al. |
| 7,901,777 B2 | 3/2011 | Hanson |
| 7,921,911 B2 | 4/2011 | Fuller et al. |
| 7,931,087 B2 | 4/2011 | Gupta |
| 7,989,069 B2 | 8/2011 | Bruner |
| 8,006,760 B2 | 8/2011 | Fleming et al. |
| 8,025,974 B2 | 9/2011 | Hanson |
| 8,034,395 B2 | 10/2011 | Hofer et al. |
| 8,043,998 B2 | 10/2011 | Pope et al. |
| 8,047,288 B2 | 11/2011 | Skala et al. |
| 8,048,487 B2 | 11/2011 | Hanson |
| 8,056,630 B2 | 11/2011 | Huang et al. |
| 8,067,103 B2 | 11/2011 | Hanson |
| 8,084,401 B2 | 12/2011 | Lukocs et al. |
| 8,092,585 B2 | 1/2012 | Schwartz et al. |
| 8,138,127 B2 | 3/2012 | Pope et al. |
| 8,178,004 B2 | 5/2012 | Hanson |
| 8,178,476 B2 | 5/2012 | Xie et al. |
| 8,201,630 B2 | 6/2012 | Welton |
| 8,227,026 B2 | 7/2012 | McDaniel et al. |
| 8,236,426 B2 | 8/2012 | Hanson |
| 8,261,825 B2 | 9/2012 | Pope et al. |
| 8,267,170 B2 | 9/2012 | Fowler et al. |
| 8,276,663 B2 | 10/2012 | Holtsclaw et al. |
| 8,276,664 B2 | 10/2012 | Gupta |
| 8,293,687 B2 | 10/2012 | Giffin |
| 8,337,985 B2 | 12/2012 | Hanson |
| 8,403,050 B2 | 3/2013 | Pope et al. |
| 8,418,759 B2 | 4/2013 | Moore et al. |
| 8,432,036 B2 | 4/2013 | Hanson et al. |
| 8,445,423 B2 | 5/2013 | Bruner et al. |
| 8,596,361 B2 | 12/2013 | Willberg et al. |
| 8,609,067 B2 | 12/2013 | Adams et al. |
| 8,629,089 B2 | 1/2014 | Dams et al. |
| 8,678,090 B2 | 3/2014 | Baran, Jr. et al. |
| 8,701,763 B2 | 4/2014 | Baran, Jr. et al. |
| 8,741,658 B2 | 6/2014 | Boss et al. |
| 8,783,352 B2 | 7/2014 | Chenevert et al. |
| 8,813,842 B2 | 8/2014 | Crandall et al. |
| 8,833,449 B2 | 9/2014 | Dams et al. |
| 8,989,847 B2 | 3/2015 | Adams et al. |
| 9,057,012 B2 | 6/2015 | Dams et al. |
| 9,200,102 B2 | 12/2015 | Baran, Jr. et al. |
| 9,226,731 B2 | 1/2016 | Liu et al. |
| 2002/0065358 A1 | 5/2002 | Carter et al. |
| 2003/0083448 A1 | 5/2003 | Fan et al. |
| 2004/0177957 A1 | 9/2004 | Kalfayan et al. |
| 2004/0186254 A1 | 9/2004 | Fan et al. |
| 2005/0244641 A1 | 11/2005 | Vincent |
| 2006/0065396 A1 | 3/2006 | Dawson et al. |
| 2006/0073393 A1 | 4/2006 | Sharma et al. |
| 2006/0272816 A1 | 12/2006 | Willberg et al. |
| 2007/0039732 A1 | 2/2007 | Dawson |
| 2007/0079965 A1 | 4/2007 | Nguyen et al. |
| 2007/0131422 A1 | 6/2007 | Gatlin et al. |
| 2007/0131425 A1 | 6/2007 | Gatlin et al. |
| 2007/0212700 A1 | 9/2007 | Ranganathan et al. |
| 2007/0219173 A1 | 9/2007 | Mangelsdorf et al. |
| 2008/0035340 A1 | 2/2008 | Welton et al. |
| 2008/0153720 A1 | 6/2008 | Huang et al. |
| 2008/0236842 A1 | 10/2008 | Bhavsar et al. |
| 2008/0257553 A1 | 10/2008 | Gatlin et al. |
| 2008/0278140 A1 | 11/2008 | Dodabalapur et al. |
| 2009/0011222 A1 | 1/2009 | Xiu et al. |
| 2009/0011248 A1 | 1/2009 | Hanson |
| 2009/0023618 A1 | 1/2009 | Futterer et al. |
| 2009/0062155 A1 | 3/2009 | Pope et al. |
| 2009/0114247 A1 | 5/2009 | Brown et al. |
| 2009/0203553 A1 | 8/2009 | Gatlin et al. |

(56) References Cited

U.S. PATENT DOCUMENTS

| | | |
|---|---|---|
| 2009/0275488 A1 | 11/2009 | Zamora et al. |
| 2009/0314549 A1 | 12/2009 | Chenevert et al. |
| 2009/0324834 A1 | 12/2009 | Hanson |
| 2010/0048429 A1 | 2/2010 | Dobson, Jr. et al. |
| 2010/0089578 A1 | 4/2010 | Nguyen et al. |
| 2010/0108379 A1 | 5/2010 | Edbury et al. |
| 2010/0130388 A1 | 5/2010 | Phatak et al. |
| 2010/0137169 A1 | 6/2010 | Pope et al. |
| 2010/0167964 A1 | 7/2010 | Pope et al. |
| 2010/0167965 A1 | 7/2010 | Sebastian et al. |
| 2010/0181068 A1 | 7/2010 | Pope et al. |
| 2010/0212905 A1 | 8/2010 | van Petegem et al. |
| 2010/0224361 A1 | 9/2010 | Pope et al. |
| 2010/0263865 A1 | 10/2010 | Willberg et al. |
| 2010/0292108 A1 | 11/2010 | Kakadjian et al. |
| 2010/0292110 A1 | 11/2010 | Pope et al. |
| 2010/0319920 A1 | 12/2010 | Pope et al. |
| 2011/0005756 A1 | 1/2011 | Kakadjian et al. |
| 2011/0028443 A1 | 2/2011 | Mangelsdorf et al. |
| 2011/0083849 A1 | 4/2011 | Medvedev et al. |
| 2011/0136704 A1 | 6/2011 | Sharma et al. |
| 2011/0160104 A1 | 6/2011 | Wu et al. |
| 2011/0201531 A1 | 8/2011 | Sharma et al. |
| 2011/0223125 A1 | 9/2011 | Hough et al. |
| 2011/0247823 A1 | 10/2011 | Dams et al. |
| 2011/0259592 A1 | 10/2011 | Reyes |
| 2011/0275947 A1 | 11/2011 | Feldman et al. |
| 2011/0319759 A1 | 12/2011 | Liu et al. |
| 2012/0003481 A1 | 1/2012 | Hanson |
| 2012/0004388 A1 | 1/2012 | Hanson |
| 2012/0088699 A1 | 4/2012 | Qin |
| 2012/0097194 A1 | 4/2012 | McDaniel et al. |
| 2012/0145390 A1 | 6/2012 | Parse et al. |
| 2012/0241156 A1 | 9/2012 | Mulchopadhyay et al. |
| 2012/0251556 A1 | 10/2012 | Sharma et al. |
| 2012/0279704 A1 | 11/2012 | Eoff et al. |
| 2012/0285689 A1 | 11/2012 | Weaver et al. |
| 2012/0285690 A1 | 11/2012 | Weaver et al. |
| 2012/0318514 A1 | 12/2012 | Mesher |
| 2012/0318515 A1 | 12/2012 | Cawiezel et al. |
| 2012/0325485 A1 | 12/2012 | Qu et al. |
| 2012/0329171 A1 | 12/2012 | Ismagilov et al. |
| 2013/0037161 A1 | 2/2013 | Hanson et al. |
| 2013/0284518 A1 | 10/2013 | Wu et al. |
| 2013/0331305 A1 | 12/2013 | Aswath et al. |
| 2014/0014586 A1 | 1/2014 | Soane et al. |
| 2014/0096967 A1 | 4/2014 | Sharma et al. |
| 2014/0121514 A1 | 5/2014 | Adams et al. |
| 2014/0162173 A1 | 6/2014 | Smith et al. |
| 2014/0224492 A1 | 8/2014 | Weaver et al. |
| 2015/0083397 A1 | 3/2015 | Monroe et al. |
| 2015/0083414 A1 | 3/2015 | Monroe et al. |
| 2015/0083416 A1 | 3/2015 | Lant et al. |
| 2015/0083417 A1 | 3/2015 | Lant et al. |
| 2015/0299561 A1 | 10/2015 | Monroe et al. |
| 2016/0069174 A1* | 3/2016 | Cannan ............... E21B 43/267 166/250.1 |

OTHER PUBLICATIONS

Ahmed M. Gomaa, Qi Qu, Russell Maharidge, Scott Nelson, Ted Reed; "New Insights into Hydraulic Fracturing of Shale Formations"; IPTC 17594; Jan. 2014; 6 pgs; International Petroleum Technology Conference; Richardson, Texas.

Ahmed M. Gomaa, Qi Qu, Russell Maharidge, Scott Nelson, ; "New Insights into Shale Fracturing Treatment Design"; SPE 167754; Feb. 2014; 15 pgs; Society of Petroleum Engineers; Richardson, Texas.

Jim Weaver, Philip Nhuyen, Stephen Ingram; "Sustaining Well Productivity"; SPE 102694; Jun. 2007; 6 pgs; Society of Petroleum Engineers; Richardson, Texas.

Jeff Hibbeler, Thomas Garcia, Dr. Nelson Chavez; "An Integrated Long-Term Solution for Migratrory Fines Damage"; SPE 81017; Apr. 2003; 11 pgs; Society of Petroleum Engineers; Richardson, Texas.

US Environmental Protection Agency; "Proceedings of the Technical Workshops for the Hydraulic Fracturing Study: Chemical & Analytical Methods"; EPA 600/R-11/066; May 2011; 122 pgs; Office of Research and Development, US Environmental Protection Agency; Washington DC.

T.W.Muecke; "Formation Fines and Factors Controlling Their Movement in Porous Media"; Journal of Petroleum Technology; Feb. 1979; 7 pgs; Exxon Production Research Co.

Philseok Kim, Tak-Sing Wong, Jack Alvarenga, Michael J. Kreder, Wilmer E. Adorno-Martinez, Joanna Aizenberg; "Liquid-Infused Nanostructed Surfaces with Extreme Anti-Ice and Anti-Frost Performance"; ACSNANO; Jun. 2012; 9 pgs; American Chemical Society; Cambridge, Massachusetts.

Aculon Inc; "Aculon AL-B"; Material Data Sheet; Jun. 2012; 1 pg; Aculon, Inc.; San Diego, California.

Aculon Inc; "Aculon E"; Material Data Sheet; Dec. 2012; 1 pg; Aculon, Inc.; San Diego, California.

Aculon Inc; "Aculon H1-F"; Material Data Sheet; Jun. 2011; 1 pg; Aculon, Inc.; San Diego, California.

TCI Europe NV; "Tetrakis" Safety Data Sheet; Nov. 2006; 4 pgs; TCI; Europe.

MacKenzie Company, LLC; "Metal Acetylacetonates"; Technical Data Sheet; 1 pg; MacKenzie Company, LLC; Bush, Louisiana.

Aculon Inc; "Aculon AL-B"; Material Data Sheet; Dec. 2012; 1 page; Aculon, Inc.; San Diego, California.

Aculon Inc; "Aculon E"; Material Data Sheet; Jun. 2012; 1 page; Aculon, Inc.; San Diego, California.

Crews, Jim; "Amazon Shale Conductivity Service—A Proposed Multi-project Development"; Baker Hughes Inc.; PowerPoint Presentation, No. 1, 2013.

Crews, Jim; "Amazon Shale Conductivity Service—A Proposed Multi-project Development"; Baker Hughes Inc.; PowerPoint Presentation, No. 2, 2013.

Eric L. Bruner, SAMPS and Oleophobic Coating, 31, Nov. 14, 2012, NJ.

Invoices for Sales of Products to Oil Industry, 2010-2013.

\* cited by examiner

COMPOSITES FOR USE IN STIMULATION AND SAND CONTROL OPERATIONS

This application claims the benefit of U.S. patent application Ser. No. 61/880,841, filed on Sep. 20, 2013; U.S. patent application Ser. No. 61/880,758, filed on Sep. 20, 2013; U.S. patent application Ser. No. 61/981,051, filed on Apr. 17, 2014 and U.S. patent application Ser. No. 61/989,267, filed on May 6, 2014; all of which are herein incorporated by reference.

FIELD OF THE DISCLOSURE

The disclosure relates to a well treating composite and to methods for using the composite. The composite is made of a solid particulate and a surface modifying treatment agent having an anchor and at least one hydrophobic tail. The hydrophobic tail is attached to the solid particulate through the anchor.

BACKGROUND OF THE DISCLOSURE

Stimulation procedures often require the use of solid particulates having high compressive strength. In hydraulic fracturing, such particulates must further be capable of enhancing the production of fluids and natural gas from low permeability formations.

In a typical hydraulic fracturing treatment, a treatment fluid containing a solid particulate or proppant is injected into the wellbore at high pressures. Once natural reservoir pressures are exceeded, the fluid induces fractures in the formation and proppant is deposited in the fracture where it remains after the treatment is completed. The proppant serves to hold the fracture open, thereby enhancing the ability of fluids to migrate from the formation to the wellbore. Because fractured well productivity depends on the ability of a fracture to conduct fluids from a formation to a wellbore, fracture conductivity is an important parameter in determining the degree of success of a hydraulic fracturing treatment.

Since the degree of stimulation afforded by the fracture treatment is dependent upon the propped width, it is important that the proppant exhibit resistance to crushing from the high stresses in the well. When the proppant is unable to withstand closure stresses imposed by the formation, the solid particulates are compressed together in such a way that they crush and fines and/or dust are generated. Generated fines and/or dust from the proppant plug pore throats in the reservoir matrix, thereby reducing reservoir permeability.

Improvements have been continuously sought to control and prevent the crushing of proppants at in-situ reservoir conditions. For instance, resin-coated proppant materials have been designed to help form a consolidated and permeable fracture pack when placed in the formation wherein the resin coating enhances the crush resistance of the proppant.

It is further necessary, when producing oil and/or gas from an unconsolidated subterranean formation, to prevent sand grains and/or other formation fines from migrating into the wellbore and being produced from the well. The creation and/or mobilization of reservoir fines during fracturing and production has also been instrumental in reducing fracture conductivity and reducing reservoir permeability due to plugging of pore throats by the fines.

A common method to control sand migration is gravel packing which is designed to prevent the production of formation sand and reduce migration of unconsolidated formation particulates into the wellbore. Typically, gravel pack operations involve placing a gravel pack screen in the wellbore. A carrier fluid carrying the solid particulates or "gravel" leaks off into the subterranean zone and/or is returned to the surface while the particulates are left in the zone and are packed in the surrounding annulus between the screen and the wellbore. The particulates operate to trap, and thus prevent the further migration of, formation sand and fines which would otherwise be produced along with the formation fluid. Like proppants, sand control particulates must exhibit high strength and be capable of functioning in low permeability formations.

In some situations the processes of hydraulic fracturing and gravel packing are combined into a single treatment to provide stimulated production and reduce formation sand production. Such treatments are often referred to as "frac pack" operations. In some cases, the treatments are completed with a gravel pack screen assembly in place and the hydraulic fracturing fluid is pumped through the annular space between the casing and screen. In such a situation, the hydraulic fracturing treatment usually ends in a screen out condition creating an annular gravel pack between the screen and casing. This allows both the hydraulic fracturing treatment and gravel pack to be placed in a single operation.

Coated and/or uncoated particulates have further been used in gravel packing to minimize the migration of generated fines and/or dust. While the use of resin coated proppants has been successful in minimizing the generation of fines during hydraulic fracturing and fine migration during gravel packing, such materials are known to often erode oil and gas production equipment. There is an ongoing need to develop particulates exhibiting crush resistance that can be used as proppants and gravel for minimizing fines generation and fines migration, reduce proppant pack and gravel pack damage, and which are less eroding to oil and gas production equipment while exhibiting tolerance to in-situ stress conditions.

In addition to concerns arising from the creation of fines and dust downhole, the release of dust during transport of proppant and sand control particulates has come recently under close scrutiny as health concerns of field workers and those within residential areas within the vicinity of on-shore fracturing has risen. There has not been an acceptable method developed to date specifically designed to reduce the release of dust from proppants and sand control particulates. While resin coating of frac sand has been noted to decrease dust production, the addition of a resin coating doubles the cost of frac sand. In addition, the chemicals used to make the resins are not environmentally friendly. Lastly, the application of resin coating to frac sand requires the sand to be heated either by electricity or the burning of natural gas, both of which are costly. Alternative methods for reducing the generation of dust from particulates as well as controlling the migration of particulates in producing formations have thus been sought.

Further, alternative materials have been sought for use in selective simulation operations. Typically, a subterranean formation penetrated by a well has a plurality of distinct zones or formations of interest. During production of fluids from the well, it usually is desirable to establish communication with only the zone or formations of interest such that stimulation treatments do not inadvertently flow into a non-productive zone or a zone of diminished interest. Selective stimulation (such as by hydraulic fracturing and acid stimulation) becomes pronounced as the life of the well declines and productivity of the well decreases.

Typically, selective stimulation entails perforating the zone and/or formation with a perforating gun placed adjacent to the zone and/or formation of interest. The procedure is repeated until all of the zones and/or formations of interest have been perforated. The perforating gun is then retrieved to the surface by means of a wireline. When fracturing is desired, the fracturing fluid is pumped into the well under pressure exceeding the pressure at which the zone and/or formations would fracture. In order to prevent the fracturing fluid from flowing into zones having greater porosity and/or lower pressure, a mechanical device, such as a straddle packer, or plug or sand fill may be set in the well between a fractured zone and the zone to be fractured to isolate the stimulated zone from further contact with the fracturing fluid. This procedure is then repeated until all of the zones of interest are perforated and fractured. Once the completion operation is finished, each plug is drilled out of or otherwise removed from the well to permit fluid to be produced to the surface.

Recently, methods and assemblies have been developed for effectuating zonal isolation between intervals of the wellbore that do not depend on the removal of perforating equipment in and out of the well. For instance, attention has been focused on the use of isolation assemblies which allow for selected treatment of productive (or previously producing intervals) in multiple interval wellbores. Zonal isolation assemblies are expensive and alternatives have been sought.

Focus has been centered recently on the use of swellable elastomeric materials as packers and isolation profilers. However, the use of swellable elastomeric polymers in wells is often limited due to evasive organic and inorganic chemicals, temperatures, pressures and other subterranean environmental factors that decrease the life and the reliability of the elastomer. Such factors also present problems to other components used in the recovery of hydrocarbons from wells. For instance, enzymes commonly used as breakers in fracturing fluids are typically inactivated at high temperatures. Their use at elevated temperatures, for instance, at temperatures greater than 150° F., causes them to denature and lose activity.

Ineffective fracturing of a formation may also result from the loss of friction between tubular and other metallic substrates within the well. Friction reduction between treatment fluids and surfaces contacted by the fluid has also presented ongoing issues. In many instances, the types of viscosifying agents which may be used in fracturing fluids is limited since friction reduction equates to a faster reduction in viscosity of the viscosifying agent upon contact with hydrocarbons. Alternatives have been sought for addressing friction reduction at in-situ downhole conditions.

Resources have also been spent on both chemical and physical techniques for effectively reducing frictional drag created during the flow of hydrocarbons within a hydrocarbon producing reservoir. Alternatives for reducing friction have focused on drag reduction agents. Typically, friction reduction agents are large polymers with long chains which tend to build non-Newtonian gel structures. Drag reducing gels are shear-sensitive and often require specialized injection equipment (such as pressurized delivery systems). Further, since friction reduction agents are typically highly viscous, usually no more than 10 weight percent of polymeric friction reduction agents are present in the carrier fluid. Some attention has been focused on the use of slurries or dispersions of polymers to form free-flowing and pumpable mixtures in liquid media. However, such polymers often agglomerate over time, thus making it very difficult for them to be placed in hydrocarbon liquids where reduced drag is needed. Further alternatives for lowering the frictional drag of fluids within a well have been sought in order to enhance the productivity of hydrocarbons from the well.

In addition, alternatives have been sought for controlling or inhibiting the formation and/or precipitation of scales, paraffins and asphaltenes during the production of hydrocarbons in subterranean formations. While well treatment agents have been successfully employed to control and/or inhibit the formation of scales, paraffins and asphaltenes, such agents are typically mixed on the fly with other components, such as proppant and sand control particulates. Alternative means of controlling the formation and/or inhibition of scales, paraffins and asphaltenes which simplify preparation of well treatment fluids on site are desired.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure, a composite is provided for treating a well. The composite comprises a surface modifying treatment agent at least partially coated onto a solid particulate. The surface modifying treatment agent has a metallic anchor and a hydrophobic tail. The hydrophobic tail is an organo-silicon material, a fluorinated hydrocarbon or both a hydrophobic organo-silicon material and a fluorinated hydrocarbon. The metallic anchor of the surface modifying treatment agent is attached to the solid particulate.

In another embodiment of the disclosure, a composite is provided for treating a well. The composite contains a solid particulate and a surface modifying treatment agent. The surface modifying treatment agent is composed of a metallic anchor and at least one hydrophobic tail attached to the metal of the metallic anchor. The metallic anchor is attached to the solid particulate.

In another embodiment of the disclosure, a composite is provided for use in a well treating operation such as hydraulic fracturing or a sand control operation. The composite has a surface modifying treatment agent which is attached to at least a portion of the surface of a solid particulate. The surface modifying treatment has a hydrophobic tail and an anchor site. The anchor links the hydrophobic tail to the solid particulate.

In another embodiment, a composite for treating a wellbore is provided which comprises (i) a solid particulate capable of withstanding stresses greater than about 1500 psi at a temperature greater than 150° F. and (ii) a surface modifying treatment agent attached to at least a portion of the surface of the solid particulate. The surface modifying treatment agent comprises an anchor and a hydrophobic tail. The hydrophobic tail is indirectly attached to the solid particulate through the anchor.

In another embodiment of the disclosure, a composite is provided for treating a wellbore, wherein the composite comprises a surface modifying treatment agent and a solid particulate capable of withstanding stresses greater than about 1500 psi at a temperature greater than 150° F. The surface modifying treatment agent comprises a metallic anchor and a hydrophobic tail. The hydrophobic tail is attached to the metal of the metallic anchor, the metallic anchor being attached to the solid particulate.

In another embodiment, a composite for treating a wellbore is disclosed, wherein the composite comprises a solid particulate and a surface modifying treatment agent of the formula X-M, wherein M is a metal containing organic ligand and X is a hydrophobic tail. The surface modifying treatment agent is attached to the solid particulate by the metal containing organic ligand.

In another embodiment, a composite for treating a wellbore is provided wherein the composite comprises (i) a solid particulate and (ii) a surface modifying treatment agent comprising the product of a metal containing organic ligand and an organo-silicon containing hydrophobic material. The metal of the metal containing organic ligand is a Group 3, 4, 5 or 6 metal and the organic ligand is an alkoxide, halide, keto acid, amine or acrylate.

In another embodiment, a method for treating a well penetrating a subterranean formation is provided. In this method, a composite of a solid particulate and a surface modifying treatment agent is introduced into the well. The surface modifying treatment agent has a metallic anchor and a hydrophobic tail. At least a portion of the surface of the solid particulate is coated with the surface modifying treatment agent. The hydrophobic tail is an organo-silicon material, a fluorinated hydrocarbon or both a hydrophobic organo-silicon material and a fluorinated hydrocarbon. The metallic anchor of the surface modifying treatment agent is attached to the solid particulate.

In another embodiment, a method for treating a well penetrating a subterranean formation is provided. In this method, a composite having a surface modifying treatment agent and a hydrophobic tail is formed in-situ within the well. In this embodiment a solid particulate may be introduced into the well. A surface modifying treatment agent is then introduced. The surface modifying treatment agent has a metallic anchor and a hydrophobic tail. The metallic anchor of the surface modifying treatment agent attaches to at least a portion of the surface of the solid particulate. The hydrophobic tail of the surface modifying treatment agent is an organo-silicon material, a fluorinated hydrocarbon or both a hydrophobic organo-silicon material and a fluorinated hydrocarbon.

In another embodiment of the disclosure, a method of treating a well penetrating a subterranean formation is provided wherein a composite is introduced into the well. The composite has a solid particulate and a surface modifying treatment agent on at least a portion of the surface of the solid particulate. The surface modifying treatment agent has a metallic anchor and at least one hydrophobic tail attached to the metal of the metallic anchor. The metallic anchor is attached to the solid particulate.

In another embodiment, a method for treating a well penetrating a subterranean formation is provided. In this method, a solid particulate is introduced into the well. A surface modifying treatment agent is then pumped into the well. The surface modifying treatment agent contains a metallic anchor and a hydrophobic tail. The metallic anchor of the surface modifying treatment agent attaches to at least a portion of the surface of the solid particulate in-situ.

In another embodiment of the disclosure, a method of reducing the amount of fines generated during a hydraulic fracturing operation or a sand control operation is provided. In the method, a solid particulate is pumped into a well penetrating a subterranean formation. A surface modifying treatment agent is attached onto at least a portion of the surface of the solid particulate. The surface modifying treatment has a hydrophobic tail and an anchor. The anchor secures the hydrophobic tail to the solid particulate.

In another embodiment of the disclosure, a composite of a surface modifying treatment agent and a solid particulate is pumped into a well. The well penetrates a formation having multiple productive zones. The surface modifying treatment agent has an anchor and a hydrophobic tail. The surface modifying treatment agent is attached to the solid particulate by its anchor. The composite isolates a predetermined productive zone from other zones of the well.

In another embodiment of the disclosure, a composite of a surface modifying treatment agent and a solid particulate is pumped into a well. The composite has an anchor and a hydrophobic tail. The surface modifying treatment agent is attached to the solid particulate by the anchor. The composite minimizes tubular friction pressures within the well.

In another embodiment of the disclosure, a composite of a surface modifying treatment agent and a solid particulate is formed in-situ in a well. The well penetrates a formation having multiple productive zones. The composite is formed by first introducing into a well a solid particulate. The surface modifying treatment agent is then introduced into the well and forms a coating on at least a portion of the surface of the solid particulate. The surface modifying treatment agent has an anchor and a hydrophobic tail. The composite isolates a pre-determined productive zone from other zones of the well.

In another embodiment of the disclosure, a composite of a surface modifying treatment agent and a solid particulate is formed in-situ in a well. The composite has an anchor and a hydrophobic tail. The composite is formed by first introducing into a well a solid particulate. The surface modifying treatment agent is then introduced into the well and forms a coating on at least a portion of the surface of the solid particulate. The surface modifying treatment agent has an anchor and a hydrophobic tail. The composite minimizes tubular friction pressures within the well.

In another embodiment of the disclosure, a method for treating a well penetrating a subterranean formation is provided wherein a composite is pumped into the well wherein the composite comprises a solid particulate and a surface modifying treatment agent on the solid particulate. The surface modifying treatment agent comprises a metal linked to a hydrophobic organo-silicon material, a fluorinated hydrocarbon or to both a hydrophobic organo-silicon material and a fluorinated hydrocarbon. The metal is attached to the solid particulate.

In another embodiment of the disclosure, a method for treating a well penetrating a subterranean formation is provided wherein a composite is pumped into the well wherein the composite comprises a solid particulate and a surface modifying treatment agent on at least a portion of the surface of the solid particulate. The surface modifying treatment agent is a reaction product of an organometallic compound having an oxygen ligand and an organo-silicon containing material.

In another embodiment of the disclosure, a method for treating a well penetrating a subterranean formation is provided wherein a composite is pumped into the well wherein the composite comprises a solid particulate and a surface modifying treatment agent of the formula X-M, wherein M is a metal containing organic ligand and X is a hydrophobic tail.

In another embodiment of the disclosure, a method of stimulating a subterranean formation is provided. In the method, a composite is pumped into a well penetrating the subterranean formation at a pressure above the fracturing pressure of the subterranean formation. The composite may be characterized by a solid particulate having coated onto at least a portion of its surface a surface modifying treatment agent. The surface modifying treatment agent contains a hydrophobic tail and an anchor for securing the hydrophobic tail to the surface of the solid particulate. The generation of fines or dust from the solid particulate is minimized during stimulation and damage to a proppant pack within the formation is minimized by the presence of the surface modifying treatment agent on the solid particulate.

In another embodiment of the disclosure, a method of reducing the generation of fines and/or dust from a proppant or sand control particulate during a well treatment operation is provided. In this embodiment, a composite is formed by self-assembly onto at least a portion of the surface of the proppant or sand control particulate a surface modifying treatment agent. The surface modifying treatment agent is characterized by a hydrophobic tail and an anchor for securing the hydrophobic tail to the proppant or sand control particulate. The amount of fines and/or dust generated from the proppant or sand control particulate is reduced by the self-assembly of the surface modifying treatment agent onto the proppant or sand control particulate.

In another embodiment, a method of reducing the generation of fines during the production of hydrocarbons from a subterranean formation is provided. In the method a proppant or sand control particulate is pumped into the well. The proppant or sand control particulate is coated with a surface modifying treatment characterized by a hydrophobic tail and an anchor for adhering the hydrophobic tail to the proppant or sand control particulate. The amount of fines generated during pumping of the proppant or sand control particulate into the well is less than the amount of fines generated during pumping of the pristine proppant or sand control particulate into the well.

In another embodiment, a method of reducing the amount of fines generated during pumping of a proppant or a sand control particulate into a well is provided. In the method, at least a portion of the surface of the proppant or sand control particulate is coated with a surface modifying treatment agent prior to pumping the proppant or sand control particulate into the well. The surface modifying treatment agent contains a hydrophobic tail and an anchor for securing the hydrophobic tail to the proppant or sand control particulate. The amount of fines generated during pumping of the proppant or sand control particulate into the well is less than the amount of fines generated during pumping of a pristine proppant or sand control particulate into the well.

In another embodiment, a method of preventing the release of dust from a proppant or sand control particulate during a well treatment operation is provided. In the method, at least a portion of the surface of the proppant or sand control particulate is coated with a surface modifying treatment agent. The surface modifying treatment agent comprises a hydrophobic tail and an anchor for securing the hydrophobic tail to the proppant or sand control particulate. The coated proppant or coated sand control particulate is then pumped into a well which penetrates a hydrocarbon producing reservoir. The amount of dust released from the proppant or sand control particulate is reduced by the presence of the surface modifying treatment agent on the surface of the proppant or sand control particulate.

In another embodiment of the disclosure, a method of increasing crush resistance of a proppant pumped into a well penetrating a subterranean formation during a hydraulic fracturing operation is provided. In this method a proppant is treated with a surface modifying treatment agent. The surface modifying treatment agent is characterized by a hydrophobic tail and an anchor for securing the hydrophobic tail to the surface of the proppant. The crush resistance of the proppant at a closure stress of 1,500 psi, API RP 5856 or API RP 60, is greater than the crush resistance of a pristine proppant at a temperature greater than 150° F.

In another embodiment of the disclosure, a method of preventing the migration of sand during a sand control operation within a well is provided. In the method, a sand control particulate agent is pumped into a well. At least a portion of the surface of the sand control particulate is treated with a surface modifying treatment comprising a hydrophobic tail and an anchor. The anchor secures the hydrophobic tail to the surface of the sand control particulate.

In another embodiment of the disclosure, a method of preventing the migration of sand during a sand control operation is provided. In the method, a sand control particulate is pumped into a well. A surface modifying treatment agent comprising a hydrophobic tail and an anchor is secured to at least a portion of the surface of the sand control particulate in-situ through the anchor.

In another embodiment of the disclosure, a method of reducing the amount of fines generated during a hydraulic fracturing operation or a sand control operation within a subterranean formation is provided. In the method, a solid particulate is pumped into a well penetrating the subterranean formation. A surface modifying treatment comprising a hydrophobic tail and an anchor is then secured onto at least a portion of the surface of the solid particulate in-situ through the anchor of the surface modifying treatment agent.

In still another embodiment of the disclosure, a method of stimulating a subterranean formation is provided wherein a fracturing fluid containing a solid particulate is pumped into a well penetrating the subterranean formation at a pressure above the fracturing pressure of the subterranean formation. A surface modifying treatment agent is secured in-situ onto at least a portion of the surface of the solid particulate. The surface modifying treatment agent comprises a hydrophobic tail and an anchor for securing the hydrophobic tail to the solid particulate. The generation of fines or dust from the solid particulate is minimized and damage to a proppant pack within the formation is minimized by the presence of the surface modifying treatment agent on the solid particulate.

In still another embodiment of the disclosure, a method of reducing the generation of fines and/or dust from a proppant or sand control particulate during a well treatment operation is provided. In this method, a proppant or sand control particulate is pumped into the well. A surface modifying treatment agent comprising a hydrophobic tail and an anchor is then pumped into the well. The surface modifying treatment agent through its anchor is secured onto at least a portion of the proppant or sand control particulate in-situ. The amount of fines and/or dust generated from the proppant or sand control particulate is reduced by the presence of the surface modifying treatment agent on the surface of the proppant or sand control particulate.

In a further embodiment of the disclosure, a method of preventing the release of dust from a proppant or sand control particulate during a well treatment operation is provided. In this method, a proppant or sand control particulate is pumped into a well penetrating a subterranean formation. A surface modifying treatment agent is secured in-situ onto at least a portion of the surface of the proppant or sand control particulate. The surface modifying treatment agent has a hydrophobic tail and an anchor. The surface modifying treatment agent is secured onto the surface of the proppant or sand control particulate through the anchor. The amount of dust released from the proppant or sand control particulate during the well treatment operation is reduced by the presence of the surface modifying treatment agent on the surface of the proppant or sand control particulate.

In still another embodiment of the disclosure, a method of increasing crush resistance of a proppant pumped into a well penetrating a subterranean formation during a hydraulic fracturing operation is provided. In this method, a surface modifying treatment agent comprising a hydrophobic tail and an anchor is secured onto at least a portion of the surface of the proppant after the proppant is placed into the well. The surface modifying treatment agent is secured onto the surface of the proppant through its anchor. The crush resistance of the proppant at a closure stress of 1,500 psi, AAPI 56 or API RP 60, is greater than the crush resistance of a pristine proppant.

In another embodiment of the disclosure, a method for treating a well penetrating a subterranean formation is provided wherein a composite is pumped into the well wherein the composite comprises (i) a solid particulate and (ii) a surface modifying treatment agent comprising the product of a metal containing organic ligand and an organo-silicon containing hydrophobic material. The metal of the metal containing organic ligand is a Group 3, 4, 5 or 6 metal and the organic ligand is an alkoxide, halide, keto acid, amine or acrylate.

In another embodiment, a method of enhancing the productivity of a subterranean formation is disclosed wherein a composite is introduced into the well. The composite comprises an elastomeric core and a surface modifying treatment agent at least partially coated onto the elastomeric core. The surface modifying treatment agent is comprised of a metal linked to a hydrophobic organo-silicon material, a fluorinated hydrocarbon or to both a hydrophobic organo-silicon material and a fluorinated hydrocarbon and wherein the metal is attached to the elastomeric core.

In another embodiment, a composite comprising an elastomeric core and a surface modifying treatment agent is disclosed in isolating a productive zone from other zones of the well. The composite comprises an elastomeric core and a surface modifying treatment agent at least partially coated onto the elastomeric core. The surface modifying treatment agent is comprised of a metal linked to a hydrophobic organo-silicon material, a fluorinated hydrocarbon or to both a hydrophobic organo-silicon material and a fluorinated hydrocarbon and wherein the metal is attached to the elastomeric core.

In another embodiment, a composite comprising an elastomeric core and a surface modifying treatment agent is disclosed to enhance the effectiveness of a breaker during a hydraulic fracturing operation. The composite comprises an elastomeric core and a surface modifying treatment agent at least partially coated onto the elastomeric core. The surface modifying treatment agent has a hydrophobic tail and an anchor for adhering the hydrophobic tail to the elastomeric core. The anchor is a metal.

In another embodiment, a composite comprising an elastomeric core and a surface modifying treatment agent is disclosed to minimize tubular frictions pressures within a well. The composite comprises an elastomeric core and a surface modifying treatment agent at least partially coated onto the elastomeric core. The surface modifying treatment agent has a hydrophobic tail and an anchor for adhering the hydrophobic tail to the elastomeric core. The anchor is a metal.

In another embodiment of the disclosure, a method of producing hydrocarbons from an underground reservoir is provided wherein a composite having an elastomeric core and a surface modifying treatment agent at least partially coated onto the elastomeric core is pumped into an underground reservoir. The surface modifying treatment agent contains a hydrophobic tail and an anchor for adhering the hydrophobic tail to the elastomeric core. The anchor is a metal. The hydrophobic tail is not directly attached to elastomeric core but is only indirectly attached through the anchor.

In another embodiment, a method of treating a subterranean formation penetrated by a well is disclosed wherein a composite having an elastomeric core and a surface modifying treatment agent at least partially coated onto the elastomeric core is pumped into the subterranean formation through a wellbore. The surface modifying treatment agent comprising, as hydrophobic tail, an organo-silicon material, a fluorinated hydrocarbon or both a hydrophobic organo-silicon material and a fluorinated hydrocarbon. The anchor is a metal.

Characteristics and advantages of the present disclosure described above and additional features and benefits will be readily apparent to those skilled in the art upon consideration of the following detailed description of various embodiments and referring to the accompanying drawings.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
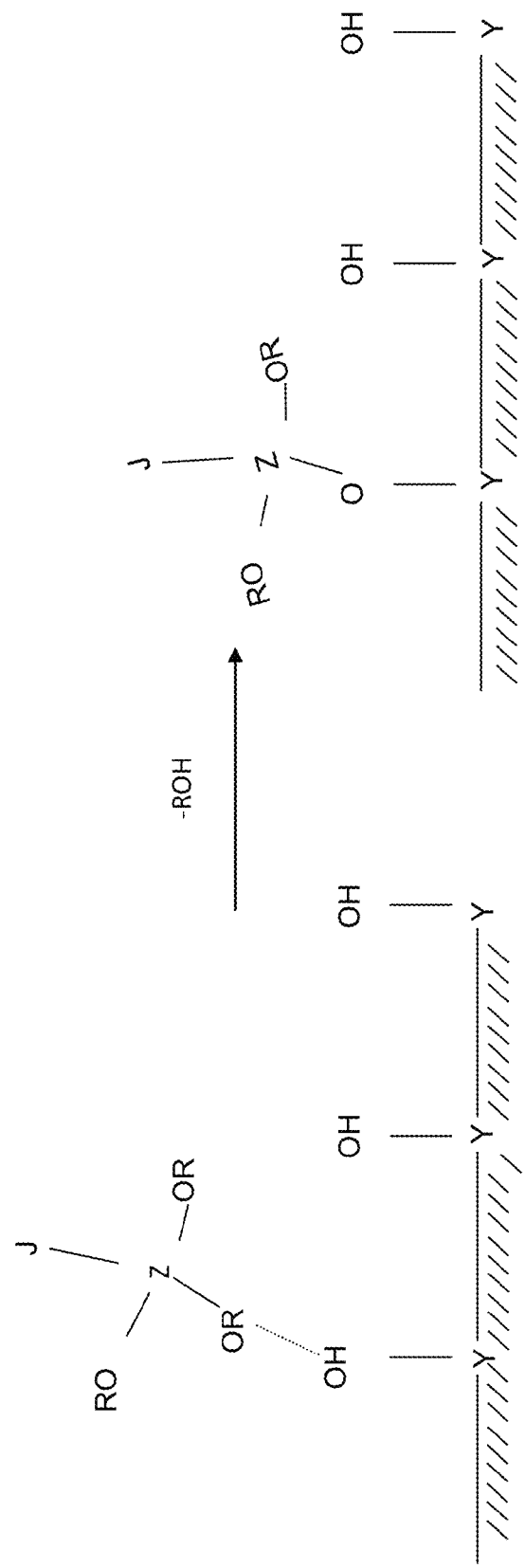
FIGS. 1 and 2 depict schematic representations of the attachment of a surface modifying treatment agent containing a metallic anchor onto the surface of a solid particulate.

Characteristics and advantages of the present disclosure and additional features and benefits will be readily apparent to those skilled in the art upon consideration of the following detailed description of exemplary embodiments of the present disclosure. It should be understood that the description herein, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the particular embodiments and details disclosed herein without departing from such spirit and scope.

Certain terms are used herein and in the appended claims may refer to particular components, process steps or well treatment operations. As one skilled in the art will appreciate, different persons may refer to a component, a process step or a well treatment operation by different names. This document does not intend to distinguish between components, process steps or well treatment operations that differ in name but not function or operation. Also, the terms "including" and "comprising" are used herein and in the appended claims in an open-ended fashion, and thus should be interpreted to mean "including, but not limited to . . . " The term "introducing" in regards to introduction of a material or fluid into a well or subterranean formation shall include pumping or injecting of the material or fluid into the well or formation. Further, reference herein and in the appended claims to components and aspects in a singular tense does not necessarily limit the present disclosure or appended claims to only one such component or aspect, but should be interpreted generally to mean one or more, as may be suitable and desirable in each particular instance.

The composite is comprised of a solid particulate and a surface modifying treatment agent which exhibits hydrophobicity. The surface modifying treatment agent may comprise a hydrophobic tail and an anchor for attaching the hydrophobic tail to the solid particulate. [As used herein, the terms "attaching" or "securing" shall include, but not be limited to, adhering, grafting, bonding (including covalently bonding), coating or otherwise linking the hydrophobic tail to the solid particulate. Also, as used herein, the term "hydrophobic tail" shall refer to the hydrophobic substituent of the surface modifying treatment agent.] The hydrophobic nature of the tail may further alter the wettability of the surface of the solid particulate. While the tail of the surface modifying treatment agent exhibits hydrophobic characteristics, it may also exhibit oleophobic properties. The surface modifying treatment agent may therefore be considered to be omniphobic.

The anchor serves to connect (preferably by covalent bonding) the surface modifying treatment agent to the surface of the solid particulate. The hydrophobic tail attached to the anchor of the surface modifying treatment agent is not believed to bind to the surface of the solid particulate. Thus, the tail of the surface modifying treatment agent is only indirectly attached to the particulate, through the anchor.

The hydrophobicity provided the solid particulate by the surface modifying treatment agent may extend the lifetime of the particulate compared to when the solid particulate is in its pristine state. [The term "pristine" as used herein refers to a solid particulate not coated with a surface modifying treatment agent. When comparing a pristine solid particulate to a solid particulate having an attached surface modifying treatment agent, it is understood that the solid particulate of the composite is the same particulate as the (uncoated or) pristine particulate.]

The composite generally has the ability to withstand greater than 20 psi stress at a temperature greater than 150° F. without breaking. When used in a hydraulic fracturing operation, the composite typically has the ability to withstand greater than about 1500 psi at a temperature greater than 150° F., API RP 56 or API RP 60, without decomposing. The particulates may deform with stress and yet are sufficiently strong to be used on their own at high pressures in excess of 4,000 psi. The composites prevent sand grains and/or other formation fines from migrating into the wellbore.

When used in a hydraulic fracturing operation, the solid particulate of the composite may be a proppant. When used in a sand control operation, the surface modifying treatment agent may be a sand control particulate.

The surface modifying treatment agent may completely surround the solid particulate. Alternatively, the surface modifying treatment agent may be applied only to a portion of the solid particulate. In a preferred embodiment, the surface modifying treatment agent may be applied onto from about 10 to 100% of the surface area of the solid particulate and preferably about 75% of the surface area of the solid particulate. In a most preferred embodiment, the surface modifying treatment agent covers all of the surface area of the solid particulate. The thickness of the surface modifying treatment agent on the solid particulate is typically between from about 2 to about 40 nm.

Typically, the composite is prepared prior to being pumped into the well and/or formation. However, the surface modifying treatment agent may be pumped into the well and the solid particulates may then be coated in-situ onto the solid particulate within the well. Thus, an embodiment of the disclosure includes the method of covalently bonding or attaching the hydrophobic, oleophobic or omniphobic tail onto proppant or gravel pack particulates under in-situ conditions. For instance, a surface modifying treatment agent may be remedially pumped into the well after a proppant pack is formed within the well and/or formation. In such instances, the surface modifying treatment agent is secured onto proppant particulates defining a proppant pack in-situ.

When the composite is formed in-situ, the surface modifying treatment agent and the solid particulate may be pumped into the wellbore using the same (as well as a different) treatment fluid.

The solid particulate of the composite may be elastomeric. The elastomers may form an elastomeric core onto which is coated the surface modifying treatment agent. Elastomers useful in the composites disclosed herein include natural rubber and man-made substances emulating natural rubber which stretch under tension, exhibit a high tensile strength, retract rapidly, and substantially recover their original dimensions. The term "elastomers" as used herein includes thermoplastic elastomers and non-thermoplastic elastomers. The term includes blends (physical mixtures) of elastomers, as well as copolymers, terpolymers, and multipolymers. Included as suitable elastomers are ethylene-propylene-diene polymer (EPDM), nitrile rubbers such as copolymers of butadiene and acrylonitrile, carboxylated acrylonitrile butadiene copolymers, polyvinylchloride-nitrile butadiene blends, chlorinated polyethylene, chlorinated sulfonate polyethylene, aliphatic polyesters with chlorinated side chains (such as epichlorohydrin homopolymer, epichlorohydrin copolymer, and epichlorohydrin terpolymer, polyacrylate rubbers such as ethylene-acrylate copolymer, ethylene-acrylate terpolymers, elastomers of ethylene and propylene, sometimes with a third monomer, such as ethylene-propylene copolymer (EPM), ethylene vinyl acetate copolymers, fluorocarbon polymers, copolymers of poly (vinylidene fluoride) and hexafluoropropylene, terpolymers of poly(vinylidene fluoride), hexafluoropropylene, and tetrafluoroethylene, terpolymers of poly(vinylidene fluoride), polyvinyl methyl ether and tetrafluoroethylene, terpolymers of poly(vinylidene fluoride), hexafluoropropylene, and tetrafluoroethylene, terpolymers of poly(vinylidene fluoride), tetrafluoroethylene, and propylene, perfluoroelastomers such as tetrafluoroethylene perfluoroelastomers, highly fluorinated elastomers, butadiene rubber, polychloroprene rubber), polyisoprene rubber, polynorbornenes, polysulfide rubbers, polyurethanes, silicone rubbers, vinyl silicone rubbers, fluoromethyl silicone rubber, fluorovinyl silicone rubbers, phenylmethyl silicone rubbers, styrene-butadiene rubbers, copolymers of isobutylene and isoprene or butyl rubbers, brominated copolymers of isobutylene and isoprene and chlorinated copolymers of isobutylene and isoprene.

Suitable examples of fluoroelastomers are copolymers of vinylidene fluoride and hexafluoropropylene and terpolymers of vinylidene fluoride, hexafluoropropylene and tetrafluoroethylene. The fluoroelastomers suitable may comprise one or more vinylidene fluoride unit, one or more hexafluoropropylene units, one or more tetrafluoroethylene units, one or more chlorotrifluoroethylene units, and/or one or more perfluoro(alkyl vinyl ether) units such as perfluoro(methyl vinyl ether), perfluoro(ethyl vinyl ether), and perfluoro (propyl vinyl ether). These elastomers can be homopolymers or copolymers. Particularly suitable are fluoroelastomers containing vinylidene fluoride units, hexafluoropropylene units, and, optionally, tetrafluoroethylene units and fluoroelastomers containing vinylidene fluoride units, perfluoroalkyl perfluorovinyl ether units, and tetrafluoroethylene units as well as copolymers of vinylidene fluoride and hexafluoropropylene units.

Commercially available thermoplastic elastomers include segmented polyester thermoplastic elastomers, segmented polyurethane thermoplastic elastomers, segmented polyamide thermoplastic elastomers, blends of thermoplastic elastomers and thermoplastic polymers, and ionomeric thermoplastic elastomers.

Other exemplary materials for the solid particulate of the composite for use in the disclosure include ceramics, sand, bauxite, alumina, minerals, nut shells, gravel, glass, resinous particles, polymeric particles, as well as combinations thereof.

Examples of ceramics include oxide-based ceramics, nitride-based ceramics, carbide-based ceramics, boride-based ceramics, silicide-based ceramics, or a combination thereof. In an embodiment, the oxide-based ceramic is silica ($SiO_2$), titania ($TiO_2$), aluminum oxide, boron oxide, potassium oxide, zirconium oxide, magnesium oxide, calcium oxide, lithium oxide, phosphorous oxide, and/or titanium oxide, or a combination thereof. The oxide-based ceramic, nitride-based ceramic, carbide-based ceramic, boride-based ceramic, or silicide-based ceramic contain a nonmetal (e.g., oxygen, nitrogen, boron, carbon, or silicon, and the like), metal (e.g., aluminum, lead, bismuth, and the like), transition metal (e.g., niobium, tungsten, titanium, zirconium, hafnium, yttrium, and the like), alkali metal (e.g., lithium, potassium, and the like), alkaline earth metal (e.g., calcium, magnesium, strontium, and the like), rare earth (e.g., lanthanum, cerium, and the like), or halogen (e.g., fluorine, chlorine, and the like). Exemplary ceramics include zirconia, stabilized zirconia, mullite, zirconia toughened alumina, spinel, aluminosilicates (e.g., mullite, cordierite), perovskite, silicon carbide, silicon nitride, titanium carbide, titanium nitride, aluminum carbide, aluminum nitride, zirconium carbide, zirconium nitride, iron carbide, aluminum oxynitride, silicon aluminum oxynitride, aluminum titanate, tungsten carbide, tungsten nitride, steatite, and the like, or a combination thereof.

Examples of suitable sands for the solid particulate include, but are not limited to, Arizona sand, Wisconsin sand, Badger sand, Brady sand, and Ottawa sand. In an embodiment, the solid particulate is made of a mineral such as bauxite and is sintered to obtain a hard material. In an embodiment, the bauxite or sintered bauxite has a relatively high permeability such as the bauxite material disclosed in U.S. Pat. No. 4,713,203, the content of which is incorporated by reference herein in its entirety.

In another embodiment, the solid particulate is a relatively lightweight or substantially neutrally buoyant particulate material or a mixture thereof. Such materials may be chipped, ground, crushed, or otherwise processed. By "relatively lightweight" it is meant that the solid particulate has an apparent specific gravity (ASG) which is less than or equal to 2.45, including those ultra lightweight materials having an ASG less than or equal to 2.25, more preferably less than or equal to 2.0, even more preferably less than or equal to 1.75, most preferably less than or equal to 1.25 and often less than or equal to 1.05.

Naturally occurring solid particulates include nut shells such as walnut, coconut, pecan, almond, ivory nut, brazil nut, and the like; seed shells of fruits such as plum, olive, peach, cherry, apricot, and the like; seed shells of other plants such as maize (e.g., corn cobs or corn kernels); wood materials such as those derived from oak, hickory, walnut, poplar, mahogany, and the like. Such materials are particles formed by crushing, grinding, cutting, chipping, and the like.

Suitable relatively lightweight solid particulates are those disclosed in U.S. Pat. Nos. 6,364,018, 6,330,916 and 6,059,034, all of which are herein incorporated by reference.

Other solid particulates for use herein include resin coated plastics, resin coated ceramics or synthetic organic particle such as beads or pellets of nylon, ceramics, polystyrene, polystyrene divinyl benzene or polyethylene terephthalate such as those set forth in U.S. Pat. No. 7,931,087, herein incorporated by reference.

The term "solid particulate" as used herein includes coated particulates as well as non-coated particulates. In an embodiment, the solid particulate may be treated with a coating (prior to application of the surface modifying treatment agent). The coating typically is not fluorinated and is not a derivative of a phosphorus containing acid. For instance, the solid particulate may be a porous ceramic having a coating, such as those set forth in U.S. Pat. No. 7,426,961, herein incorporated by reference.

In an embodiment, any of the solid particulates disclosed herein may be coated, e.g., with a resin, prior to application of the surface modifying treatment agent. In some instances, the coating may impart resistance to the solid particulate and thus minimize defragmentation of the solid particulate during downhole operations using the composite disclosed herein. Such coatings include cured, partially cured, or uncured coatings of, e.g., a thermoset or thermoplastic resin.

The coating of the solid particulate may be an organic compound that includes epoxy, phenolic, polyurethane, polycarbodiimide, polyamide, polyamide imide, furan resins, or a combination thereof. The phenolic resin is, e.g., a phenol formaldehyde resin obtained by the reaction of phenol, bisphenol, or derivatives thereof with formaldehyde. Exemplary thermoplastics include polyethylene, acrylonitrile-butadiene styrene, polystyrene, polyvinyl chloride, fluoroplastics, polysulfide, polypropylene, styrene acrylonitrile, nylon, and phenylene oxide. Exemplary thermosets include epoxy, phenolic (a true thermosetting resin such as resole or a thermoplastic resin that is rendered thermosetting by a hardening agent), polyester resin, polyurethanes, epoxy-modified phenolic resin, and derivatives thereof.

In another embodiment, the solid particulate, prior to application of the surface modifying treatment agent, is a resin coated plastic, resin coated ceramic proppant.

In an embodiment, the coating of the solid particulate is a crosslinked resin. The crosslinked coating typically provides crush strength, or resistance for the solid particulates.

Preferred solid particulates are those which have groups on their surface that are reactive with functional groups associated with the anchor. For instance, where the surface modifying treatment agent contains a metallic anchor, the surface modifying treatment agent may be bound to the surface of the particulate by binding the metal of the metallic anchor to the surface. The surface may contain an oxide of silica or aluminum or have another reactive site for interaction with the anchor of the surface modifying treatment agent. For instance, the particulate may be silica sand or a ceramic.

The particle size of the solid particulates may be selected based on anticipated downhole conditions. In this regard, larger particle sizes may be more desirable in situations where a relatively lower strength particulate material is employed. The solid particulates typically have a size ranging from about 4 mesh to about 100 mesh, alternatively from about 20 mesh to about 40 mesh.

The surface modifying treatment agent as disclosed herein is stable at in-situ temperature and pressure conditions within the well. The surface modifying treatment agent further enhances the lifetime of the solid particulate.

In a preferred embodiment, the anchor comprises a metal and the hydrophobic tail comprises an organo-silicon material, a fluorinated hydrocarbon or both an organo-silicon material and a fluorinated hydrocarbon.

The anchor of the surface modifying treatment agent may be a metal and preferably is Group 3, 4, 5, or 6 metal. In a preferred embodiment, the metal is a Group 4 metal, such as Ti, Zr or Hf, a Group 5 metal, such as Ta or Nb, a Group 6 metal, such as W, or a metal of the lanthanide series, such as La.

Figure 2:
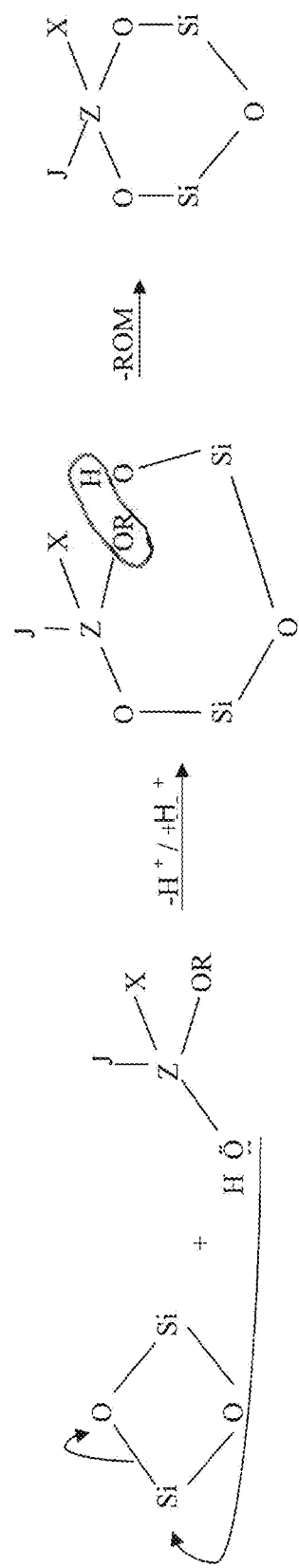

While not being bound to any theory, it is believed that the metal of the surface modifying treatment agent is the anchor and covalently binds to the surface of the solid particulate. Examples are set forth in FIG. 1 and FIG. 2 where J represents the hydrophobic tail and Z represents the metal of the anchor. In FIG. 1, the surface of the solid particulate contains a free —OH which may, for example, be attached to an aluminum atom or a silicon atom. As illustrated, the metal of the surface modifying treatment agent may bind to the oxygen atom of the silicon-oxo or the aluminum-oxo linkage of the substrate by reaction with the —OH group. In FIG. 2, the surface of the solid particulate is shown as containing a silicon-oxo group without a free —OH. The mechanism of reaction of the surface modifying treatment agent is illustrated as being different from that set forth in FIG. 1. The hydrophobic tail is not believed to bind to the solid particulate per se. Thus, the hydrophobic tail of the surface modifying treatment agent is only indirectly attached to the solid particulate through the attachment site.

In an embodiment, the organo-silicon containing material may be a silane, polysiloxane or a polysilazane.

Examples of organo-silicon containing materials are those having the formula $R^1_{4-x}SiA_x$ or $(R^1_3Si)_yB$ as well as organo(poly)siloxanes and organo(poly)silazanes containing units of the formula:

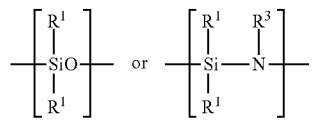

where $R^1$ may be the same or different and is a hydrocarbon radical containing from 1 to 100, such as 1 to 20 carbon atoms and 1 to 12, preferably 1 to 6 carbon atoms and $R^3$ may be hydrogen or a hydrocarbon or substituted hydrocarbon having 1 to 12, preferably 1 to 6 carbon atoms. In addition, $R^1$ may be a substituted, hydrocarbon radical such as halo, particularly a fluoro-substituted hydrocarbon radical. The organo(poly)siloxane may further contain additional units of the formula: $R^5_2SiO_2$ where $R^5$ is a halogen such as a chloro or fluoro substituent.

In an embodiment, the organo-silicon containing compound may be an organo(poly)siloxane or organo(poly)silazane of a number average molecular weight of at least 400, usually between 1000 and 5,000,000.

The substituent A in $R^1_{4-x}SiA_x$ may be hydrogen, a halogen such as chloride, OH, $OR^2$ or

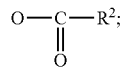

wherein B in the above structural formula may be $NR^3_{3-y}$, $R^2$ a hydrocarbon or substituted hydrocarbon radical containing from 1 to 12, typically 1 to 4 carbon atoms. $R^3$ is hydrogen or has the same meaning as $R^1$. x is 1, 2 or 3, y is 1 or 2.

Preferably, $R^1$ is a fluoro-substituted hydrocarbon. Preferred are such fluoro-substituted hydrocarbons are those of the structure:

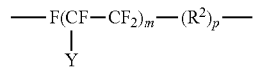

where Y is F or $C_nF_{2n+1}$; m is 4 to 20 and n is 1 to 6; $R^2$ is alkyl containing from 1 to 4 carbon atoms and p is 0 to 18. Also, fluoro-substituted hydrocarbons may be of the structure:

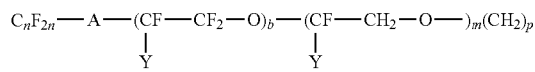

where A is an oxygen radical or a chemical bond; n is 1 to 6, y is F or $C_nF_{2n}$; b is at least 1, such as 2 to 10; m is 0 to 6 and p is 0 to 18.

Preferred organo-silicon materials include halogenated siloxanes, halogenated alkoxysiloxanes such as perfluoroalkoxysiloxane (PFOSi), alkoxy halogenated alkoxysilanes, such as alkoxy-perfluoroalkoxysilane; alkoxyacetylacetonate halogenated polysiloxanes, such as alkoxyacetylacetonate-perfluoroalkoxysiloxane, alkoxy-alkylsilylhalides; polyalkylsiloxanes, such as polydimethylsiloxanes, and alkoxyacetylacetonate-polyalkylsiloxanes, such as alkoxyacetylacetonate (acac) polydimethylsiloxanes. Exemplary surface modifying treatment agents include tantalum halide-perfluoroalkoxysiloxane, such as $TaCl_5$:PFOSi; tantalum alkoxy-perfluoroalkoxysilane; tantalum alkoxyacetylacetonate-perfluoroalkoxysiloxane, like Ta(EtO)$_4$acac:PFOSi; tantalum alkoxy-alkylsilylhalide; tantalum halide-polyalkylsiloxane, like $TaCl_5$:PDMS; niobium alkoxide-perfluoroalkoxysiloxane, such as Nb(EtO)$_5$:PFOSi and Ta(EtO)$_5$:PFOSi; titanium alkoxide-perfluoroalkoxysiloxane, like Ti(n-BuO)$_4$:PFOSi; zirconium alkoxide-perfluoroalkoxysiloxane; lanthanum alkoxide-perfluoroalkoxysilane, like La(iPrO)$_3$:PFOSi; tungsten chloride-perfluoroalkoxysiloxane, like WCl$_6$:PFOSi; tantalum alkoxide-polyalkylsiloxane, like Ta(EtO)$_5$:PDMS; and tantalum alkoxyacetylacetonate-polyalkylsiloxane, like Ta(EtO)$_4$acac:PDMS.

In an embodiment, the fluorinated hydrocarbon is $R_f$—$(CH_2)_p$—X where $R_f$ is a perfluorinated hydrocarbon group including an oxygen substituted hydrocarbon group, such as a perfluorinated alkyl group or a perfluorinated alkylene ether group and p is 0 to 18, preferably 0-4, and X is a polar group such as a is carboxyl, like of the structure —(C=O)—OR; and R is hydrogen, perfluoroalkyl, alkyl or substituted alkyl containing from 1 to 50 carbon atoms.

Examples of perfluoroalkyl groups are those of the structure F—(CFY—CF$_2$)$_m$ where Y is F or C$_n$F$_{2n+1}$; m is 4 to 20 and n is 1 to 6.

Examples of perfluoroalkylene ether groups are those of the structure:

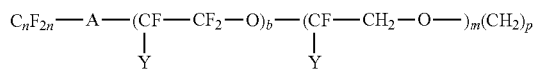

where A is an oxygen radical or a chemical bond; n is 1 to 6, Y is F or C$_n$F$_{2n}$; b is 2 to 20, m is 0 to 6, and p is 0 to 18, preferably 2 to 4 and more preferably 2.

Preferred fluorinated materials are esters of perfluorinated alcohols such as the alcohols of the structure F—(CFY—CF$_2$)$_m$—CH$_2$—CH$_2$—OH where Y is F or C$_n$F$_{2n+1}$; m is 4 to 20 and n is 1 to 6.

Further preferred as fluorinated hydrocarbons are perfluorinated hydrocarbons of the structure R$_f$—(CH$_2$)$_p$—X where R$_f$ is a perfluoroalkylene ether group or a perfluorinated alkyl group such as those described above, p is an integer of from 0 to 18, preferably 0 to 4, and X is a carboxyl group, preferably a carboxylic ester group containing from 1 to 50, preferably from 2 to 20 carbon atoms in the alkyl group that is associated with the ester linkage.

Further preferred as fluorinated hydrocarbons are perfluorinated hydrocarbons of the structure R$_f$—(CH$_2$)$_p$—Z where R$_f$ and p are as defined above, preferably R$_f$ is a perfluoroalkylene ether group such as those described above, and p is from 2 to 4, and Z is a phosphorus acid group. Examples of phosphorus acid groups are:

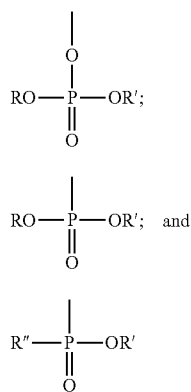

where R" is a hydrocarbon or substituted hydrocarbon radical having up to 200, such as 1 to 30 and 6 to 20 carbons, R" can also include the perfluoroalkyl groups mentioned above, and R' is H, a metal such as potassium or sodium or an amine or an aliphatic radical, for example, alkyl including substituted alkyl having 1 to 50 carbons, preferably lower alkyl having 1 to 4 carbons such as methyl or ethyl, or aryl including substituted aryl having 6 to 50 carbons.

Preferably, the phosphorus acid is of formula II where R and R' are H.

The surface modifying treatment agent may be represented by the formula X-M, wherein M is the metal containing organic ligand and X is the hydrophobic tail represented by the organo-silicon containing material, the fluorinated hydrocarbon or a combination of organo-silicon containing material and fluorinated hydrocarbon. The composite may be formed by reacting M with a reactive group, such as a silicon atom or an aluminum atom, on the surface of the particulate.

The tail of the surface modifying treatment agent may be aligned such that the hydrophobicity character of the treatment agent is imparted away from the anchor. Water and thus aqueous fluids within the well may easily slide across the surface of the particulate carrying hydrocarbons with it as lateral adhesion of the fluid is reduced.

In a preferred embodiment, the tail may self-align to the surface of the solid particulate such that the hydrophobic tail is opposite to the surface. Thus, during a well treatment operation, the tail of the surface modifying treatment agent may align itself such that hydrophobic group of the surface modifying treatment agent is imparted away from the surface of the proppant or gravel pack.

In an embodiment, the tail of the surface modifying treatment agent self-aligns onto the surface of the particulate to form a multi-layer assembly. The formation of one or more layers of surface modifying treatment agents onto the surface of the particulate is believed to occur by chemical binding-induced spontaneous organization of the tail.

The surface modifying treatment agent may be formed by reacting a metal containing organic ligand, such as a derivatized alkoxide, with an organo-silicon containing material and/or fluorinated hydrocarbon group. The metal of the metal containing organic ligand may be covalently bonded to the organosilicon compound to form the anchor and the hydrophobic tail.

The metal containing organic ligand may be formed by reacting a metal compound, such as a metal halide, like TaCl$_5$, with an oxygen containing ligand. Depending upon the position of the transition metal on the Periodic Chart, the metal containing organic ligand may have from two to six organic ligand groups.

In an embodiment, the ligand of the metal containing organic ligand contains an alkoxide or ester. Suitable organometallic derivatives include metal derivatives of C$_1$ to C$_{18}$ alkoxides, preferably alkoxides containing from 2 to 8 carbon atoms such as ethoxide, propoxide, isopropoxide, butoxide, isobutoxide and tertiary butoxide. For instance, the metal containing organic ligand may be a transition metal tetra-alkoxide, such as zirconium tetra tert-butoxide.

The alkoxides may be in the form of simple esters and polymeric forms of the alkoxylates and esters as well as various chelates and complexes. For example, with the metal Ta, the simple esters could be Ta(OR)$_5$ where R is C$_1$ to C$_{18}$ alkyl. Polymeric esters may be obtained by condensation of an alkyl ester and can have the structure RO—[Ta(OR)$_3$—O—]$_x$—R where R is defined above and x is a positive integer.

Further, the organometallic compound can include, for instance, when the metal is titanium or zirconium:

(a) alkoxylates having the general formula M(OR)$_4$, wherein M is selected from Ti and Zr and R is C$_{1-18}$ alkyl;

(b) polymeric alkyl titanates and zirconates obtainable by condensation of the alkoxylates of (a), i.e., partially hydrolyzed alkoxylates of the general formula RO[-M(OR)$_2$O—]$_{x-1}$R, wherein M and R are as above and x is a positive integer;

(c) titanium chelates, derived from ortho titanic acid and polyfunctional alcohols containing one or more additional hydroxyl, halo, keto, carboxyl or amino groups capable of donating electrons to titanium. Examples of these chelates are those having the general formula $Ti(O)_a(OH)_b(OR')_c(XY)_d$, wherein $a=4-b-c-d$; $b=4-a-c-d$; $c=4-a-b-d$; $d=4-a-b-c$; R' is H, R as above or X—Y, wherein X is an electron donating group such as oxygen or nitrogen and Y is an aliphatic radical having a two or three carbon atom chain such as:

(i) —$CH_2CH_2$—, e.g., of ethanolamine, diethanolamine and triethanolamine, or

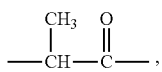

(ii) lactic acid,

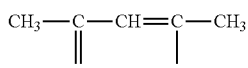

(iii) acetylacetone enol form, and

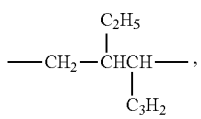

(iv) 1,3-octyleneglycol, (d) titanium acrylates having the general formula $Ti(OCOR)_{4-n}(OR)_n$ wherein R is $C_{1-18}$ alkyl as above and n is an integer of from 1 to 3, and polymeric forms thereof, or (e) mixtures thereof.

Acetyl acetonates, alkanolamines, lactates and halides, such as chloride, can also be used as the ligand of the oxygen containing organic ligand. In addition, the oxygen containing ligand can contain a mixture of ligands selected alkoxides, acetyl acetonates, alkanolamines, lactates and halides.

Suitable methods for preparing the surface modifying treatment agents wherein the organo portion of the metal containing organic ligand is reactive with the organo-silicon containing material or fluorinated hydrocarbon group are disclosed in U.S. Pat. Nos. 7,879,437 and 8,067,103, herein incorporated by reference. In one embodiment, for instance, the organo portion of the organometallic compound may be selected from those groups that may be reactive with the acids (or their derivatives) of a perfluoroalkylene ether.

As an example, the surface modifying treatment agent could be prepared by mixing the metal containing organic ligand and the silicon-containing material or fluorinated hydrocarbon in a closed system to avoid hydrolysis of the reactants. Reaction can occur neat or in the presence of a non-reactive solvent such as chlorinated or fluorinated solvent, for example, methylene chloride. Heat may be used to initiate and complete the reaction. Solvent may be removed by evaporation and the reaction product can be redissolved in a suitable solvent such as an alcohol, for example, ethanol or propanol, for application to the substrate. The mole ratio of the organosilicon-containing material to the metal containing organic ligand is typically from 100:1 to 1:100, preferably from 1:1 to 10:1 depending on the valence of the metal of the metal containing organic ligand. For example, the molar ratio of organosilicon compound to Ta(V) is typically 5 to 1.

In an embodiment, the surface modifying treatment agent may be represented by the formula $X_a(OR)_bM$, wherein OR is a $C_1$ to $C_{18}$ alkoxide, X is the hydrophobic tail represented by the organo-silicon material or the fluorinated hydrocarbon, M is metal of the metal containing organic ligand and $a+b$ equals the valency of M and further wherein neither a nor b are zero.

The composites disclosed herein may be prepared by mixing the solid particulate and surface modifying treatment agent in a vessel at room temperature for a certain period of time, preferably from about 2 to about 5 minutes. The solid can then be filtered and dried at room temperature, under vacuum or in an oven at a temperature between from about 100 to about 400° F., but preferably between from about 100 to about 200° F., most preferably about 150° F. Alternatively the liquid might be left with the solid and the mixture put in oven at a temperature between from about 100 to about 400° F., preferably between from about 100 to about 200° F., most preferably about 150° F. The product is then cooled to room temperature. Alternatively, the composites may be prepared by use of fluidized bed or spray or dip coating techniques.

The surface modifying treatment agent may be dissolved or dispersed in a diluent to form a solution. The solution may then be applied onto the solid particulate. Suitable diluents include alcohols such as methanol, ethanol or propanol; aliphatic hydrocarbons such as hexane, isooctane and decane, ethers, for example, tetrahydrofuran and dialkylethers such as diethylether. Diluents for fluorinated materials can include perfluorinated compounds such as perfluorinated tetrahydrofuran.

The surface modifying treatment agent of the composites is capable of forming an oleophilic surface onto the solid particulate. The oleophilic surface is believed to facilitate the movement of aqueous treatment fluid since water will be repelled by the oleophilic surface.

An adherent may be applied onto the solid particulate prior to application of the surface modifying treatment agent. The adherent may be an adhesive or tackifying resin and serves to assist the adhesion of the surface modifying treatment agent onto the solid particulate. The adherent may further be a layer which provides a reactive functional group to the solid particulate.

In a preferred embodiment, an organometallic material is used as adherent. Such organometallic compounds include those derived from a transition metal, such as a Group IIIB metal or a transition metal selected from Group IVB, VB and VIB. Preferred transition metals are titanium, zirconium, lanthanum, hafnium, tantalum and tungsten.

The organo portion of the organometallic may contain an alkoxide and/or halides. Examples of suitable alkoxide groups are those containing from 1 to 18 carbon atoms, preferably 2 to 8 carbon atoms, such as ethoxide, propoxide, isopropoxide, butoxide, isobutoxide and tertiary butoxide. Examples of suitable halides are fluoride and chloride. Other ligands which may also be present are acetyl acetonates.

Suitable organometallic compounds may be esters and polymeric forms of the esters including:

i. alkoxylates of titanium and zirconium having the general formula $M(OR)_4$, wherein M is selected from Ti and Zr and R is $C_{1-18}$ alkyl;

ii. alkyl esters of titanium and zirconium having the general formula $(X)_{4-y}$-$M(OR)_y$, wherein M is selected from Ti and Zr; X is selected from fluorine and chlorine; R is $C_{1-18}$ alkyl and y=2 to 3;

iii. polymeric alkyl titanates and zirconates obtainable by condensation of the alkyl esters of (a), i.e., partially hydrolyzed alkyl esters of the general formula RO[-M(OR)(X)O—]$_y$R, wherein M, R and X are as above and y is a positive integer, iv. titanium chelates, derived from ortho titanic acid and polyfunctional alcohols containing one or more additional hydroxyl, halo, keto, carboxyl or amino groups capable of donating electrons to titanium. Examples of these chelates are those having the general formula Ti(O)$_a$(OH)$_b$(OR')$_c$(XY)$_d$, wherein a=4-b-c-d; b=4-a-c-d; c=4-a-b-d; d=4-a-b-c; R' is H, R as above or X—Y, wherein X is an electron donating group such as oxygen or nitrogen and Y is an aliphatic radical having a two or three carbon atom chain such as:

(a) —CH$_2$CH$_2$—, e.g., of ethanolamine, diethanolamine and triethanolamine, or

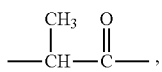

(b) lactic acid,

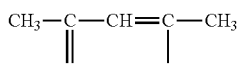

(c) acetylacetone enol form, and

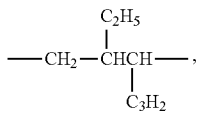

(d) 1,3-octyleneglycol, v. titanium acrylates having the general formula Ti(OCOR)$_{4-n}$(OR)$_n$ wherein R is C$_{1-18}$ alkyl as above and n is an integer of from 1 to 3, and polymeric forms thereof, or vi. mixtures of (a) and (b).

The organometallic compound is usually dissolved or dispersed in a diluent. Examples of suitable diluents are alcohols such as methanol, ethanol and propanol, aliphatic hydrocarbons, such as hexane, isooctane and decane, ethers, for example, tetrahydrofuran and dialkyl ethers such as diethyl ether. Alternatively, the organometallic compound may be applied to the solid particulate by vapor deposition techniques.

The concentration of the organometallic compound in the composition is not particularly critical but is usually at least 0.001 millimolar, typically from 0.01 to 100 millimolar, and more typically from 0.1 to 50 millimolar.

The adherent may be applied to the solid particulate by mixing all of the components at the same time with low shear mixing or by combining the ingredients in several steps. The organometallic composition may be applied to the solid particulate by conventional means such as immersion coating such as dipping, rolling, spraying or wiping to form a film. The diluent is permitted to evaporate. This can be accomplished by heating to 50-200° C.

The composite is especially useful in the treatment of sandstone formations, carbonate formations and shale.

The composite may be pumped in a carrier or treatment fluid in order to facilitate placement of the composite to a desired location within the formation. Any carrier fluid suitable for transporting the particulate into a well and/or subterranean formation fracture in communication therewith may be employed including, but not limited to, carrier fluids including a brine, salt water, unviscosified water, fresh water, potassium chloride solution, a saturated sodium chloride solution, liquid hydrocarbons, and/or a gas such as nitrogen or carbon dioxide. The composite may be pumped into the reservoir as a component of a fluid. The fluid may be pumped into the formation at any time. Thus, for instance, the composite may be pumped into the reservoir as a component of a fracturing fluid, pad fluid, acidizing fluid, etc.

The concentration of the surface modifying treatment agent in a fluid pumped into the reservoir is typically between from about 0.01% to 100% or more typically between from about 0.1% to about 20% (v/v). In an embodiment, the composites may be used in slickwater fracturing operations at relatively low concentrations.

The tail of the surface modifying treatment agent may align itself such that hydrophobicity of the surface modifying treatment agent is imparted away from the surface of the solid particulate. Since the hydrophobic tail of the surface modifying treatment agent is aligned away from the solid particulate, the solid particulate can be more effectively used.

The composite improves wellbore productivity. In fracturing, the composite provides high-conductivity communication within the formation, thereby allowing for an increased rate of oil and gas production. Permeability of the formation is thus enhanced when the surface modifying treatment agent is attached onto the surface of the solid particulate as compared to when the pristine (or untreated) solid particulate is used by itself. Further, use of the disclosed composites effectively results in greater conductivity than when conventional proppants are used.

Further, conductivity may be increased by use of the method disclosed herein since the hydrophobic tail effectively assists in removing residual polymer. The increased conductivity may be attributable to greater effective propped fracture lengths. Greater effective propped fracture length translates to improved stimulation efficiency, well productivity and reservoir drainage.

The composites are particularly effective in hydraulic fracturing operations with a breaker, such as an enzyme breaker, to impart omniphobicity (hydrophobic and oleophobic characteristics) around the breaker. This assists in the stability of the breaker especially at high temperatures, such as in excess of 160° F., in some cases in excess of 180° F. and in some in cases in excess of 220° F.

In such applications, the composite is directed toward improving wellbore productivity and/or controlling the production of fracture proppant or formation sand.

The surface modifying treatment agent is also useful in the coating of a proppant pack in-situ. Packing of proppant may be dependent on the apparent specific gravity of the proppant. For instance, the packing may be between from about 0.02 to about 0.8 lbs. per sq. ft for a proppant with an apparent specific gravity between about 1.06 to about 1.5. The packing of proppant may cause an increase in porosity of the fracture.

In addition, the composites are effective as particulates in a gravel packing operation. When used in sand control operations, the treatment may or may not employ a gravel pack screen, may be introduced into a wellbore at pressures below, at or above the fracturing pressure of the formation, such as frac pack, and/or may be employed in conjunction with resins such as sand consolidation resins if so desired. As an alternative to a screen, any other method in which a pack of particulate material is formed within a wellbore that it is permeable to fluids produced from a wellbore, such as oil, gas, or water, but that substantially prevents or reduces production of formation materials, such as formation sand, from the formation into the wellbore may be used. The hydrophobic character of the composites disclosed herein further enhance productivity by preventing migration of unconsolidated formation particulates into the wellbore and to prevent flowback of proppant or gravel pack particulates with produced fluids. The decreased propensity for flowback created by the composites may be accountable by the consolidation of the particulates extended by the surface modifying treatment agent.

The presence of the surface modifying treatment agents on the solid particulate further reduces frictional drag of fluids within the hydrocarbon producing reservoir. The frictional drag may be created during the turbulent flow of fluids within the well. Further, the reduction in frictional drag occurs during the pumping of produced hydrocarbons from the hydrocarbon producing reservoir. The reduction in frictional drag within the well is thus attributable to the bonding of the surface modifying treatment agent onto the surface of the solid particulate. Thus, frictional drag is reduced and flow of hydrocarbon (or water phase) improved by the presence of the surface modifying treatment agent on the solid particulate.

In addition, the reduction in friction within the well provided by the surface modifying treatment agent decreases the embedment or the possibility of embedment of proppant within the formation. This is particularly pronounced in shale formations.

When bound to the surface of the solid particulate, the sliding angle between fluids within the well and the composite is reduced compared to a pristine solid particulate not having the surface modifying treatment agent. Fluid flow improvement has been evident in both hydrocarbon and aqueous phases. The reduction in sliding angle further is of benefit in enhancing load recovery of water by increasing the recovery of flowback water from the well after a fracturing fluid has been returned to the surface.

As used herein, the sliding angle (also known as tilting angle) is a measurement of the lateral adhesion of a drop of a fluid to the surface of a substrate. Thus, the sliding angle of a fluid on a substrate having a surface modifying treatment agent bonded thereto is less than the sliding angle of the same fluid on the (same) substrate ("pristine unmodified substrate") which does not have the surface modifying treatment agent bonded thereto. Where the surface modifying treatment agent is bond only to a portion of the substrate, the sliding angle of the drop of fluid on the portion of the substrate having the surface modifying treatment agent bonded thereto is less than the sliding angle of the fluid on the substrate not having the surface modifying treatment agent bonded thereto.

The reduction in frictional drag during the production of hydrocarbons from the well may be measured by a reduction in the sliding angle of the fluid with the formation surface. The reduction in adhesion bond strength results in reduced drag between the liquid and the solid surface, allowing for easier fluid flow at a given stress. The decrease in sliding angle accelerates the flow of fluid from the well by lessening the amount of fluid trapped within the formation.

In an embodiment, the sliding angle of a fluid to a surface of the solid particulate treated with the surface modifying treatment agent may be less than or equal to 60'; in some cases less than or equal to 20'; in other cases less than or equal to 10° and in some other cases less than or equal to 5°. In one instance, the sliding angle for hydrocarbons has been observed to be less than 10°. In another instance, the reduction in lateral adhesion of a fluid has been observed by a reduction in the sliding angle from 80° (non-treated substrate) to 40° (treated substrate).

The reduction in sliding angle is independent of the contact angle. The contact angle refers to the angle between a drop of the liquid and the surface of the solid particulate. A high contact angle reduces the normal adhesion of a liquid droplet to the solid surface due to a reduction of the liquid-solid contact area.

The contact angle is a measure of hydrophobicity. Typically, a liquid is considered to be "non-wet" or hydrophilic when the contact angle is less than 90° and "non-wetting" or hydrophobic when the contact angle is greater than 90°. A surface having a water contact angle greater than 150° is usually termed "ultra-hydrophobic" characterizing a water-repellant surface. A superhydrophobic surface may have a contact angle hysteresis less than 10°; in some cases less than 5°. When the contact angle is less than 90°, the wetting tendency of the surface modified substrate may greater when the substrate is rough versus smooth. When the contact angle is greater than 90°, the substrate may repel more when the substrate is rough.

Since hydrophobicity prevents the formation of water blocks on the surface of the substrate, the contact angle is indicative of the capillary pressure within the substrate. Whereas the contact angle is representative of static conditions, the sliding angle is representative of fluid movement downhole. No relationship can be drawn between the contact angle and sliding angle. As such, the contact angle provides no indication of the sliding angle. Improvement in frictional drag has been seen with a reduced sliding angle and a contact angle less than or equal to 20°. Further, improvements in frictional drag have been observed with a reduced sliding angle and a contact angle greater than or equal to 120°. For instance, the effectiveness of surface modifying treatment agents on substrate surfaces to reduce frictional drag has been seen with fluids exhibiting a contact angle less than 20° and a sliding angle less than 20° and a contact angle greater than 120° and a sliding angle less than 20°.

The amount of fines or dust typically generated from a pristine solid particulate under in-situ conditions may be reduced by attaching the surface modifying treatment agent to at least a portion of the surface of the solid particulate. For instance, the amount of fines generated during pumping of a proppant or sand control particulate into a well is less when the surface modifying treatment agent is attached to at least a portion of the solid particulate than the amount of fines generated during pumping the of the pristine proppant or sand control particulate into the well.

The decrease in the generation of fines and/or dust may further be attributable to friction reduction within the well imparted by the presence of the surface modifying treatment agent on the surface of the solid particulate. As described, the particulate may be pumped into the well first and the surface modifying treatment agent then pumped into the well to coat the particulate in-situ. The amount of fines and/or dust generated from the solid particulate is reduced by the surface modifying treatment agent.

When the particulates are present within the formation as a pack, the amount of fines generation and thus damage to the formation or operation which normally attributable to the spalling of fines from the particulate pack within the formation may be minimized when the particulates of the pack are coated with the surface modifying treatment agent than when the particulates are in their pristine state.

In addition to minimizing the generation of fines and/or dust during a well treatment operation, the composites may be used to prevent sand grains as well as formation fines from migrating into the wellbore.

The composite may also be used in treatments near wellbore in nature (affecting near wellbore regions). In an embodiment, the composites may be used as packers or isolation profilers and in effectuating zonal isolation within a formation. Seals exposed to the composites defined herein may have reduced contact area with fluids within the wellbore. This reduced contact area may improve the lifetime of the seals. In selective simulation operations, the solid particulate is preferably elastomeric.

The surface modifying treatment agent further protects the solid particulate from invasive organic and inorganic chemicals and other subterranean environmental factors that decrease the life and the reliability of the particulate, such as temperatures and pressures.

The surface modifying treatment agent coated onto the solid particulate further reduces friction between tubular and other metallic substrates within the well. When used in fracturing, the composite may minimize friction reduction and thus assist in maintaining viscosity of the fluid upon contact with hydrocarbons and adverse environmental factors. Further, the composite is subjected to less grinding within the well at in-situ conditions in light of the reduction in friction.

The hydrophobic tail of the surface modifying treatment agent may provide reduced surface energy, such that water and other liquids may be repelled. As such, such surface may be "self-cleaning," meaning that water and other liquids rolling off the composites may remove unwanted materials. For example, corrosive materials used in drilling may be removed from earth-boring tools in the presence of the composites than tools exposed to such composites. Upon removal from a wellbore, tools exposed to the disclosed composites may be cleaner than tools not exposed to such composites and may therefore require less effort to properly clean and store them.

In addition, wellbore operation tools may be exposed to lower frictional forces against formation materials. Thus, such tools may require lower pump pressures and flow rates to operate than similar tools without being exposed to the disclosed composites.

The presence of such composites in flow lines may further provide less frictional forces on fluids traveling through them. Thus, pressure losses within flow lines containing the composites may be lower than pressure losses in flow lines not exposed to such composites. The composites thus offer the ability to use smaller pumps, smaller flow lines, or drilling in regions which require higher pressure.

Any of the solid particulates described herein as the solid particulate of the composite may also be used as a (pristine) particulate in combination with the composite. For instance, a composite as described herein having a ceramic as the solid particulate (onto which a surface modifying treatment agent has been applied) may also be used in combination with a conventional or untreated ceramic proppant. The solid particulate of the composite and the proppant used in admixture with the composite does not have to be the same material. Any combination may be acceptable. For instance, a composite of a ceramic particulate and a surface modifying treatment agent may be admixed with sand. A composite of a sand particulate and surface modifying treatment agent may be used in combination with a nylon proppant and so on.

The hydrophobic tail of the composite disclosed herein may be also effective to passively inhibit, control, prevent or remove scale deposition onto or within the formation. The hydrophobic tail minimizes or decreases the ability of such materials to adhere to the formation. This may be attributable to the hydrophobic nature of such minerals scales as calcium, barium, magnesium salts and the like including barium sulfate, calcium sulfate, and calcium carbonate scales. The composites may further have applicability in the treatment of other inorganic scales, such as metal sulfide scales, like zinc sulfide, iron sulfide, etc. Since such scales tend to plug the pore spaces and reduce the porosity and permeability of the formation, the surface modifying treatment agent described herein improves the permeability of the formation.

The bulky nature of the hydrophobic tail of the composites further may assist, prevent or control deposition of organic particulates onto the formation substrate. This may assist in the return of fines the surface with produced fluid.

In addition, the hydrophobic tail of the composites disclosed herein minimizes binding sites for organic particulates within the well. Thus, the composites may be used to control or prevent the deposition of organic materials (such as paraffins and/or asphaltenes) within or onto the formation. Such solids and particulates are known to negatively impact the overall efficiency of completion of wells and, like scale inhibitors, can precipitate from produced water and create blockages in flow paths within the formation. The formation and deposition of such unwanted contaminants decrease permeability of the subterranean formation, reduce well productivity, and, in some cases, may completely block well tubing.

The composite may further serve a passive anti-microbial function in order to counter bacterial growth principally caused by nitrogen and/or phosphorus in formation water or within fluid injected into the formation. The hydrophobicity of the composite may repel the fluid from the formation and thus decreases contact time of the fluid in the formation. This prevents the build-up of aerobic bacteria, anaerobic bacteria and other microbials.

Thus, by functioning as well treatment additives, the composites offer advantages to operators since they often minimize or eliminate the need for such components. This also facilitates mixing operations on the fly. This is especially the case where limited space is available to operators.

Further, the composites of the disclosure may be used in remedial fluids (such as an acidizing fluid or a scale inhibition fluid, or a gravel pack fluid). The omniphobicity offered by the tail of the surface modifying treatment agent is of benefit during clean-up of the well and fluids within the well, such as fracturing fluids.

Further, the tail of the surface modifying treatment agent may also be used in remedial workovers of wells in order to keep silicates in suspension and to remove clay, fine and sand deposits as well as inorganic scales from downhole screens and from drilling fluid damage. The hydrophobic tail of the composite minimizes the formation of calcium fluoride and magnesium fluoride or sodium or potassium fluorosilicate or fluoroaluminate within the well. Such action further provides a remedial solution having minimal downtime at low costs.

Further, the hydrophobic nature of the tail of the composite alters the wetability of the surface of the solid particulate. Thus, when used as a proppant or sand control particulate, the hydrophobic layer coated onto the particulate lowers the water saturation and enhances recovery of water from the formation.

In addition, the hydrophobic tail of the surface modifying treatment agent may alter the surface energy of the proppant or sand control particulate. The reduction in surface energy is likely the resultant of reduced charge density on the surface of the composite. Production of hydrocarbons from the formation is therefore improved by use of the composite disclosed herein.

The well treatment composite disclosed here may be prepared on location by spraying or mixing the solid particulates and letting them react for at least five minutes for the surface modification reaction to take place before placement into the wellbore. A primer may also be applied onto the solid particulate prior to application of the surface modifying treatment agent. The primer may be an adhesive or tackifying resin and serves to assist the adhesion of the surface modifying treatment agent onto the solid particulate. The primer may be an organometallic compound such as those referenced herein. In such case, the organo portion of the organometallic preferably contains an alkoxide and/or halide.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended drawings and claims.

All percentages set forth in the Examples are given in terms of weight units except as may otherwise be indicated.

EXAMPLES

Example 1

Permeability testing was performed on synthetic cores composed of 20-40 Carbolite proppant and 80-100 mesh silica sand. Each of the synthetic cores was 1.0" in diameter and 2.0" in length and having nitrogen permeability of 100 and was saturated with ISOPAR™ paraffinic fluid. Each of the cores was then installed in a hydrostatic core holder apparatus and tested individually. Approximately 200 psi back pressure was applied at the exit end and approximately 1,000 psi confining stress (overburden pressure) was applied around the entire cylinder. The confining stress pressure simulates stress in the downhole formation. An aqueous solution of 2% potassium chloride (KCl) was then flowed through the core in order to establish baseline permeability to the water at residual oil saturation. Following establishment of baseline water permeability, ISOPAR™ paraffinic fluid was flowed through the core until a baseline permeability to oil was established at irreducible water saturation. Pressure drop was measured across the entire length of the core and was used to calculate individual baseline permeability to water and to oil.

A five pore volume of a neat fluid of H1-F was then injected into the core and allowed to soak for about one hour in the 20-40 Carbolite. After treatment, paraffinic fluid was flowed through the core and permeability of oil at irreducible water saturation was then measured and the percent retention in permeability was then determined. After oil, water was flowed measuring permeability of water at residual oil after treatment and comparing that to the water right before treatment. As such, the oil at irreducible water saturation and the water at residual oil saturation were measured and the percent retention in permeability was then determined.

A second core 80-100 mesh silica sand already surface modified with H1-F was prepared. The silica sand and H1-F was mixed together for about five minutes, and then the mixture was put in the oven overnight until the sand was completely dried. The core was made after the sand cooled down to room temperature following the method described previously. The core was first saturated in paraffinic fluid then loaded into the hydrostatic core holder at the same conditions as previous. Water was flowed measuring permeability of water at residual oil after treatment and comparing that to the water right before treatment. After water, paraffinic oil was flowed through the core and permeability of oil at irreducible water saturation was then measured and the percent retention in permeability was then determined. As such, the oil at irreducible water saturation and the water at residual oil saturation were measured and the percent retention in permeability was then determined.

Figure 3:
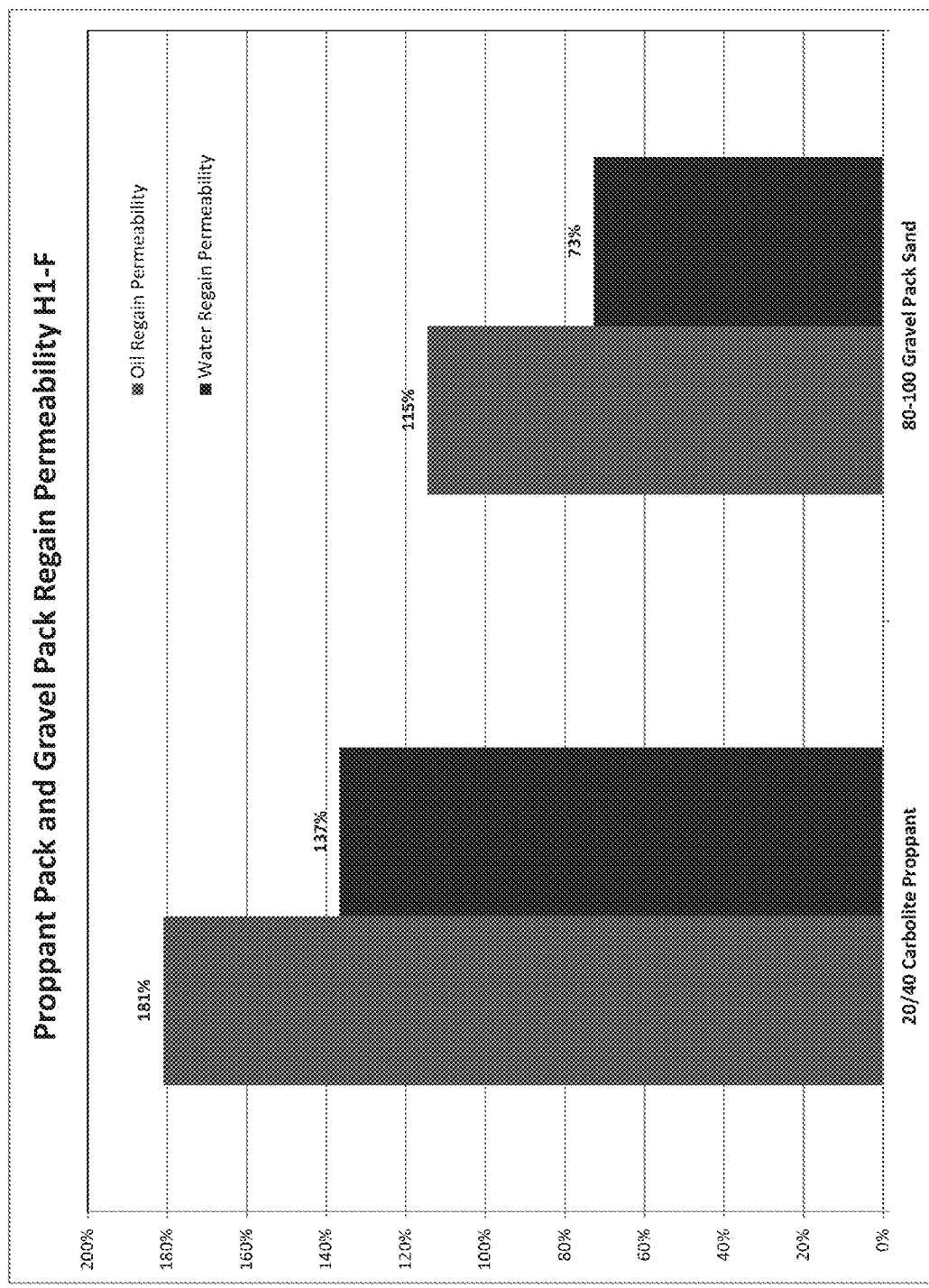
FIG. 3 illustrates retention in permeability in a synthetic core containing 20-40 Carbolite proppant and 80-100 mesh silica sand when using the surface modifying treatment agent described herein

Retention in permeability in the synthetic core containing 20-40 Carbolite proppant and 80-100 mesh silica sand is illustrated in FIG. 3.

Example 2

Gel recovery in proppant/gravel pack was determined by weighing one kilogram of particles, than packing them in a 12 inches long, 2 inches in diameter column. Three liters of deionized water, followed by two liters of linear gel (40 ppt, lb per thousand gallon,) HEC and 3 liters of water were run through the pack. The differential pressure was recorded and used to calculate the percent permeability.

Three sample were tested: (1) silica sand (control frac sand); (2) E-modified silica sand (E-Mod Frac Sand) and (3) H1-F modified silica sand (H1-F Mod Frac Sand). The surface modified silica sand were prepared by mixing the sand with the solution containing the surface treatment, mixing for about five minutes than drying in an oven overnight at 150° F. The samples were cooled down before use.

Figure 4:
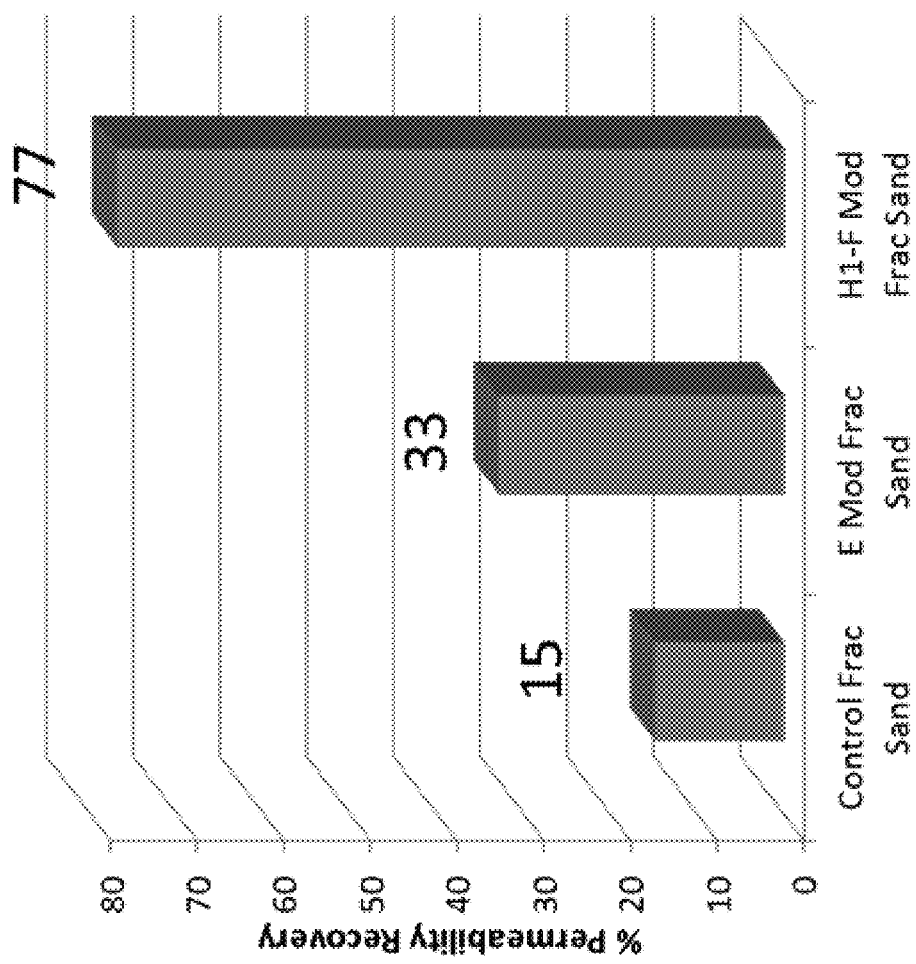
FIG. 4 illustrates the permeability recovery in a proppant/gravel (treated and untreated) after exposing the pack to water, linear gel and then water.

Permeability recovery in the proppant/gravel (treated and untreated) after exposing the pack to water, linear gel and then water is illustrated in FIG. 4.

The methods that may be described above or claimed herein and any other methods which may fall within the scope of the appended claims can be performed in any desired suitable order and are not necessarily limited to any sequence described herein or as may be listed in the appended claims. Further, the methods of the present disclosure do not necessarily require use of the particular embodiments shown and described herein, but are equally applicable with any other suitable structure, form and configuration of components.

Example 3

White Northern Sand, commercially available from Unimin Corporation, having a size of 20/40 mesh (proppant) was modified using three surface modifying treatment agents. Each of the surface modifying treatment agents, available from Aculon, Inc., had a hydrophobic tail and an anchor. The surface modifying treatment agents may be identified as H1-F and Aculon E [comprising 2% of a treatment agent having a transition metal (anchor) linked to a fluorinated hydrocarbon tail in an organic solvent] and AL-B [comprising 2% of an organophosphonate (anchor) having a hydrocarbon polymeric hydrophobic tail in an organic solvent blend]. Aculon-E and AL-B exhibits hydrophobic and oleophobic properties while H1-F exhibits hydrophobic properties only. 1.5 kg of sand was mixed with the surface modifying treatment agent for 5 minutes at room temperature. Coating of the surface modifying treatment agent onto the surface of the proppant proceeded by self-assembly of monolayers. Such self-assembled monolayers (SAMs) provided highly ordered molecular assemblies which formed spontaneously by chemisorption and self-organization of long chain molecules having hydrophobic and oleophobic groups onto the surface of the proppant. The hydrophobic and oleophobic groups were anchored onto the surface of the proppant through a condensation reaction with the oxygen species on the surface of the sand, thus providing a strong covalent bond. This further increased the longevity of the lifespan of the surface of the particulate. Self-assembly of the surface modifying treatment agent onto the surface of the proppant rendered a coating approximately 4 to 20 nm thick. The proppant having the coated SAMs were then kept in an oven at 150° F. until completely dry. After the sample was cooled, it was split accordingly to API RP 56, and crush tests were performed. Table 1 show the results obtained for 6,000 and 7,000 psi crush tests for uncoated and surface modified sand.

TABLE 1

| Stress (PSI) | % fines-Control Sample | % fines H1-F modified sand | % fines E-modified sand | % fines AL-B modified sand |
|---|---|---|---|---|
| 6,000 | 8.36 | 4.81 | 5.13 | 4.40 |
| 7,000 | 12.25 | 8.72 | 9.23 | 10.50 |

From the data it is clearly seen that the coated sand has a better tolerance to stress than uncoated sand, as the percent of fines dramatically decrease.

While exemplary embodiments of the disclosure have been shown and described, many variations are possible within the scope of the appended claims and may be made and used by one of ordinary skill in the art without departing from the spirit or teachings of the invention and scope of appended claims. Thus, all matter herein set forth or shown in the accompanying drawings should be interpreted as illustrative, and the scope of the disclosure and the appended claims should not be limited to the embodiments described and shown herein.

Preferred embodiments of the present disclosure thus offer advantages over the prior art and are well adapted to carry out one or more of the objects of this disclosure. However, the present disclosure does not require each of the components and acts described above and are in no way limited to the above-described embodiments or methods of operation. Any one or more of the above components, features and processes may be employed in any suitable configuration without inclusion of other such components, features and processes. Moreover, the present disclosure includes additional features, capabilities, functions, methods, uses and applications that have not been specifically addressed herein but are, or will become, apparent from the description herein, the appended claims.

The methods that may be described above or claimed herein and any other methods which may fall within the scope of the appended claims can be performed in any desired suitable order and are not necessarily limited to any sequence described herein or as may be listed in the appended claims. Further, the methods of the present invention do not necessarily require use of the particular embodiments shown and described herein, but are equally applicable with any other suitable structure, form and configuration of components.

Variations, modifications and/or changes of the composites and methods of the present invention, such as in the components, details of construction and operation are possible may be made and used by one of ordinary skill in the art without departing from the spirit or teachings of the invention and scope of appended claims. Thus, all matter herein set forth should be interpreted as illustrative, and the scope of the disclosure and the appended claims should not be limited to the embodiments described and shown herein.

What is claimed is:

1. A composite for treating a well wherein the composite comprises a surface modifying treatment agent at least partially coated onto a solid particulate and wherein the surface modifying treatment agent comprises a metallic anchor and a hydrophobic tail wherein the hydrophobic tail is an organo-silicon material, a fluorinated hydrocarbon or both a hydrophobic organo-silicon material and a fluorinated hydrocarbon and further wherein the metallic anchor of the surface modifying treatment agent is attached to the solid particulate.

2. The composite of claim 1, wherein the hydrophobic tail is a derivative of a silane, polysiloxane or a polysilazane.

3. The composite of 1, wherein the metal of the metallic anchor is a Group 3, 4, 5, or 6 metal.

4. The composite of claim 3, wherein the metal of the metallic anchor is selected from the group consisting of Ti, Zr, La, Hf, Ta, W and Nb.

5. The composite of claim 1, wherein the hydrophobic tail is a derivative of an organo-silicon of the formula:

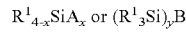

or an organo(poly)siloxane or organo(poly)silazane of the formula:

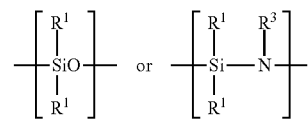

where:
R$^1$ are identical or different and are a hydrocarbon or substituted hydrocarbon radical containing from 1 to 100 carbon atoms;
A is hydrogen, halogen, OH, OR$^2$ or

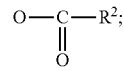

B is NR$^3_{3-y}$;
R$^2$ is a hydrocarbon or substituted hydrocarbon radical containing from 1 to 12 carbon atoms;
R$^3$ is hydrogen or R$^1$;
x is 1, 2 or 3; and
y is 1 or 2.

6. The composite of claim 5, wherein the organo(poly)siloxane or organo(poly)silazane has units of the formula:

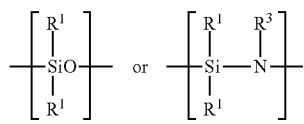

where $R^1$ are identical or different and are a hydrocarbon or substituted hydrocarbon radical containing from about 1 to about 12 carbon atoms; and $R^3$ is hydrogen or $R^1$.

7. The composite of claim 1, wherein the fluorinated hydrocarbon contains the structure:

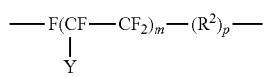

where Y is F or $C_nF_{2n+1}$; m is 4 to 20 and n is 1 to 6; $R^2$ is alkyl containing from 1 to 4 carbon atoms and p is 0 to 18.

8. The composite of claim 1, wherein the fluorinated hydrocarbon is of the structure:

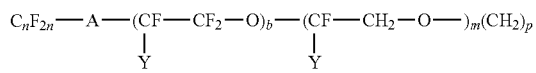

where A is an oxygen radical or a chemical bond; n is 1 to 6, Y is F or $C_nF_{2n}$; b is at least 1; m is 0 to 6 and p is 0 to 18.

9. The composite of claim 1, wherein the hydrophobic tail contains units of $R^5{}_2SiO_2$ where $R^5$ is halogen.

10. The composite of claim 1, further comprising an adherent between the solid particulate and the metallic anchor of the surface modifying agent for bonding the metallic anchor to the solid particulate.

11. The composite of claim 10, wherein the adherent is an organometallic compound.

12. The composite of claim 11, wherein the organometallic compound comprises a transition metal selected from the group consisting of titanium, zirconium, lanthanum, hafnium, tantalum and tungsten and mixtures thereof.

13. The composite of claim 1, wherein the solid particulate is selected from the group consisting of ceramics, sand, minerals, nut shells, gravel, polymeric particles, and mixtures thereof.

14. The composite of claim 13, wherein the polymeric particles are beads or pellets of polystyrene, nylon, polystyrene divinylbenzene, polyethylene terephthalate or a combination thereof.

15. The composite of claim 13, wherein the solid particulate further has a resinous coating.

16. A proppant or sand control particulate comprising the composite of claim 1.

17. The composite of claim 1, wherein the solid particulate comprises an elastomer.

18. The composite of claim 17, wherein the elastomer is selected from the group consisting of natural rubber, ethylene-propylene-diene polymers (EPDM), nitrile rubbers, carboxylated acrylonitrile butadiene copolymers, polyvinylchloride-nitrile butadiene blends, chlorinated polyethylene, chlorinated sulfonate polyethylene, aliphatic polyesters having chlorinated side chains, polyacrylate rubbers, ethylene-acrylate terpolymers, copolymers of ethylene and propylene, and optionally with one or more other ethylenically unsaturated monomers, ethylene vinyl acetate copolymers, fluorocarbon polymers and copolymers, polyvinyl methyl ether, butadiene rubber, polychloroprene rubber, polyisoprene rubber, polynorbornenes, polysulfide rubbers, polyurethanes, silicone rubbers, vinyl silicone rubbers, fluoromethyl silicone rubber, fluorovinyl silicone rubbers, phenylmethyl silicone rubbers, styrene-butadiene rubbers, copolymers of isobutylene and isoprene or butyl rubbers, brominated copolymers of isobutylene and isoprene and chlorinated copolymers of isobutylene and isoprene and mixtures thereof.

19. The composite of claim 18, wherein the elastomer is natural rubber or a polymer of at least one of the monomers selected from the group consisting of vinylidene fluoride, hexafluoropropylene, tetrafluoroethylene, chlorotrifluoroethylene, perfluoro(alkyl vinyl ether).

20. A method for treating a well penetrating a subterranean formation, comprising introducing into the well the composite of claim 1 or forming the composite in-situ in the well.

21. The method of claim 20 wherein at least one of the following conditions prevail:
    (a) the surface modifying treatment agent functions as a passive anti-microbial agent;
    (b) the surface modifying treatment agent functions to passively inhibit or control scale deposition onto or within the subterranean formation;
    (c) the surface modifying treatment agent of the composite passively prevents or controls deposition of organic particulates onto or within the surface of the subterranean formation; or
    (d) the surface modifying treatment agent of the composite controls proppant flowback.

22. The method of claim 20, wherein the composite is pumped into the well during a hydraulic fracturing operation and further wherein the solid particulate is capable of withstanding stresses greater than about 1500 psi at a temperature greater than 150° F.

23. The method of claim 20, wherein the composite is formed in-situ in the well by first pumping the solid particulate into the well and then at least partially coating the solid particulate by subsequently pumping the surface modifying treatment agent into the well.

24. A composite for treating a wellbore, wherein the composite comprises a solid particulate and a surface modifying treatment agent at least partially coated onto a solid particulate, the surface modifying treatment agent comprising an anchor and at least one hydrophobic tail attached to the anchor wherein the anchor is attached to the solid particulate.

25. The composite of claim 24, wherein the surface modifying treatment agent is a reaction product of an organometallic compound having an oxygen ligand and an organo-silicon containing material.

26. The composite of claim 24, wherein the surface modifying treatment agent is of the formula X-M where M is a metal containing organic ligand and X is a hydrophobic tail.

27. A method for treating a well penetrating a subterranean formation, comprising introducing into the well the composite of claim 24 or forming the composite in-situ within the well.

28. The method of claim 27, wherein the composite is pumped into the well or is formed in-situ within the well during a hydraulic fracturing operation or a sand control operation.

29. The method of claim 27, wherein the formation penetrated by the well has multiple productive zones and wherein the composite isolates a pre-determined productive zone from other zones of the well.

30. The method of claim 27, wherein the composite minimizes tubular friction pressures within the well.

31. The method of claim 27, wherein the amount of fines and/or sand migrated during treatment of the well is decreased by the presence of the surface modifying treatment agent coated onto the solid particulate.

32. The method of claim 27, wherein the hydrophobic tail of the composite is aligned away from the surface of the solid particulate.

33. The method of claim 27, wherein a fluid containing the composite is pumped into the well during a hydraulic fracturing operation and wherein the solid particulate is a proppant and further wherein the crush resistance of the proppant at a closure stress of 1,500 psi, AAPI 56 or API RP 60, is greater than the crush resistance of a pristine proppant not having the surface modifying treatment agent at least partially coated onto the proppant.

34. The method of claim 27, further comprising producing hydrocarbons from the well and reducing frictional drag during hydrocarbon production.

35. The method of claim 27, wherein the fluid in the well has a sliding angle on the surface of the composite which is less than the sliding angle of the same fluid on the surface of a pristine solid particulate not having the surface modifying treatment agent attached thereto.

\* \* \* \* \*